United States Patent
Choi et al.

(10) Patent No.: US 11,894,513 B2
(45) Date of Patent: Feb. 6, 2024

(54) SOLID ION CONDUCTOR, SOLID ELECTROLYTE AND ELECTROCHEMICAL CELL COMPRISING THE SAME, AND METHOD OF PREPARING THE SOLID ION CONDUCTOR

(71) Applicant: Samsung Electronics Co., Ltd., Suwon-si (KR)

(72) Inventors: Wonsung Choi, Hwaseong-si (KR); Jusik Kim, Hwaseong-si (KR); Gabin Yoon, Seoul (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 202 days.

(21) Appl. No.: 17/370,032

(22) Filed: Jul. 8, 2021

(65) Prior Publication Data
US 2022/0158225 A1  May 19, 2022

(30) Foreign Application Priority Data
Nov. 16, 2020  (KR) .......... 10-2020-0153080

(51) Int. Cl.
*H01M 10/0562* (2010.01)
*H01M 4/62* (2006.01)
(Continued)

(52) U.S. Cl.
CPC ........ *H01M 10/0562* (2013.01); *H01M 4/62* (2013.01); *H01M 10/052* (2013.01);
(Continued)

(58) Field of Classification Search
CPC .......... H01M 10/0562; H01M 10/052; H01M 10/0585; H01M 4/62; H01M 12/08; H01M 2300/0071; H01M 2300/0091
See application file for complete search history.

(56) References Cited

U.S. PATENT DOCUMENTS 9,853,322 B2   12/2017  Kawaji et al.
10,411,293 B2   9/2019  Sousa Soares De Oliveira Braga et al.
(Continued)

FOREIGN PATENT DOCUMENTS

CN  109712823 A  5/2019
CN  109734306 A  5/2019
(Continued)

OTHER PUBLICATIONS

James A. Dawson et al., "Composition Screening of Lithium- and Sodium-Rich Anti-Perovskites for Fast-Conducting Solid Electrolytes," J. Phys. Chem. C, Sep. 26, 2018, pp. 23978-23984, vol. 122.
(Continued)

*Primary Examiner* — Matthew J Merkling
(74) *Attorney, Agent, or Firm* — CANTOR COLBURN LLP

(57) ABSTRACT

A solid ion conductor, a solid electrolyte and electrochemical device including the same, and a method of preparing the solid ion conductor are disclosed. The solid ion conductor includes a compound represented by Formula 1:

$$Li_aM_bM'_cX_dO_e \qquad \text{Formula 1}$$

wherein, in Formula 1, M is one or more metals selected from Lu, Ho, Nd, Sm, Eu, Gd, Tb, Dy, Er, Tm, Yb, Ga, In, Ce, Pr, Ti, Zr, or Hf, each having an oxidation number of +3 or +4, M' is one or more metals selected from Na, K, Cs, Cu, or Ag, each having an oxidation number of +1, X is one or more halogens, $0<a<4$, $0.5<b<1.5$, $0 \le c<1.5$, $0<d<6.5$, and $0<e<1$.

29 Claims, 7 Drawing Sheets

(51) Int. Cl.
    *H01M 10/052*     (2010.01)
    *H01M 10/0585*     (2010.01)
    *H01M 12/08*     (2006.01)

(52) U.S. Cl.
    CPC ....... *H01M 10/0585* (2013.01); *H01M 12/08* (2013.01); *H01M 2300/0071* (2013.01); *H01M 2300/0091* (2013.01)

(56) References Cited

U.S. PATENT DOCUMENTS

| | | | |
|---|---|---|---|
| 2019/0081352 A1* | 3/2019 | Sasaki | H01M 4/366 |
| 2020/0212478 A1 | 7/2020 | Sakai et al. | |
| 2022/0131125 A1* | 4/2022 | Yushin | C23C 16/045 |
| 2022/0246983 A1* | 8/2022 | Suzuki | H01M 10/0562 |

FOREIGN PATENT DOCUMENTS

| | | |
|---|---|---|
| CN | 107425218 B | 10/2019 |
| JP | 2003257241 A | 9/2003 |
| JP | 2020109047 A | 7/2020 |
| KR | 1020150018409 A | 2/2015 |

OTHER PUBLICATIONS

Shuo Wang et al., "Lithium Chlorides and Bromides as Promising Solid-State Chemistries for Fast Ion Conductors with Good Electrochemical Stability," Communications, Angew. Chem. Int. Ed., May 15, 2019, pp. 8039-8043, vol. 58.

\* cited by examiner

SOLID ION CONDUCTOR, SOLID ELECTROLYTE AND ELECTROCHEMICAL CELL COMPRISING THE SAME, AND METHOD OF PREPARING THE SOLID ION CONDUCTOR

CROSS-REFERENCE TO RELATED APPLICATION

This application claims priority to Korean Patent Application No. 10-2020-0153080, filed on Nov. 16, 2020, in the Korean Intellectual Property Office, and all the benefits accruing therefrom under 35 U.S.C. § 119, the content of which is incorporated herein by reference in its entirety.

BACKGROUND

1. Field

The present disclosure relates to a solid ion conductor, a solid electrolyte and electrochemical cell comprising the same, and a method of preparing the solid ion conductor.

2. Description of the Related Art

To achieve high energy density, an electrochemical device, for example, an all-solid secondary battery, uses lithium metal having high energy density as an anode, and a solid ion conductor as an electrolyte for stable operation.

Oxide-based solid ion conductors and sulfide-based solid ion conductors are being extensively researched as solid ion conductors. An oxide-based solid ion conductor has high chemical stability but is poorer than the sulfide-based solid ion conductor in ion conductivity and formability. A sulfide-based solid ion conductor has high ion conductivity and good formability, but undesirable gases can be generated when it reacts with water.

Therefore, there is a demand for a solid ion conductor having excellent ion conductivity, excellent cycle stability with respect to a lithium-containing metal electrode when assembled in a cell, and a solid electrolyte and electrochemical device including the same having improved reversible capacity, and a method of preparing the solid ion conductor.

SUMMARY

An aspect is to provide a solid ion conductor having excellent ion conductivity and excellent cycle stability with a lithium-containing metal electrode when assembled in a cell, and reversible exhibition of designed cathode capacity.

Another aspect is to provide a solid electrolyte including the solid ion conductor.

Still another aspect is to provide an electrochemical cell including the solid ion conductor.

Still another aspect is to provide a method of preparing the solid ion conductor.

Additional aspects will be set forth in part in the description which follows and, in part, will be apparent from the description, or may be learned by practice of the presented embodiments of the disclosure.

According to an aspect, provided is a solid ion conductor including a compound represented by Formula 1 below:

$$\text{Li}_a\text{M}_b\text{M}'_c\text{X}_d\text{O}_e \qquad \text{Formula 1}$$

wherein, in Formula 1,
M is one or more metals selected from Lu, Ho, Nd, Sm, Eu, Gd, Tb, Dy, Er, Tm, Yb, Ga, In, Ce, Pr, Ti, Zr, or Hf, which has an oxidation number of +3 or +4,
M' is one or more metals selected from Na, K, Cs, Cu, or Ag, which has an oxidation number of +1,
X is one or more halogens
$0<a<4$, $0.5<b<1.5$, $0\leq c<1.5$, $0<d<6.5$, and $0<e<1$.

According to another aspect, provided is a solid electrolyte including the solid ion conductor, and optionally one or more of an oxide solid electrolyte, or a sulfide solid electrolyte.

According to another aspect, provided is an electrochemical device comprising a cathode layer, an anode layer, a solid electrolyte layer disposed between the cathode layer and the anode layer, wherein one or more of the cathode layer, the anode layer, or the solid electrolyte layer comprises the solid electrolyte or the above-mentioned solid electrolyte.

According to another aspect, provided is a method of preparing a solid ion conductor comprising: preparing a precursor for forming a solid ion conductor;
providing a precursor mixture for forming a solid ion conductor by performing mechanical milling on the precursor for forming the solid ion conductor; and preparing a solid ion conductor including a compound represented by Formula 1 by molding the precursor mixture for forming the solid ion conductor:

$$\text{Li}_a\text{M}_b\text{M}'_c\text{X}_d\text{O}_e \qquad \text{Formula 1}$$

wherein, in Formula 1,
M is one or more metals selected from Lu, Ho, Nd, Sm, Eu, Gd, Tb, Dy, Er, Tm, Yb, Ga, In, Ce, Pr, Ti, Zr, or Hf, which has an oxidation number of +3 or +4,
M' is one or more metals selected from Na, K, Cs, Cu, or Ag, which has an oxidation number of +1,
X is one or more halogens
$0<a<4$, $0.5<b<1.5$, $0\leq c<1.5$, $0<d<6.5$, and $0<e<1$.

A method of manufacturing an electrochemical device includes providing a cathode; providing an anode; and disposing a solid electrolyte layer between the cathode and the anode to manufacture the electrochemical device, wherein one or more of the cathode, the anode, or the solid electrode comprises the above-described solid ion conductor.

In yet another aspect, a protected cathode layer comprises a cathode layer; and a protective film comprising the above-described solid ion conductor on the cathode layer.

A protected anode layer comprises an anode layer; and a protective film comprising the above-described solid ion conductor on the anode layer.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
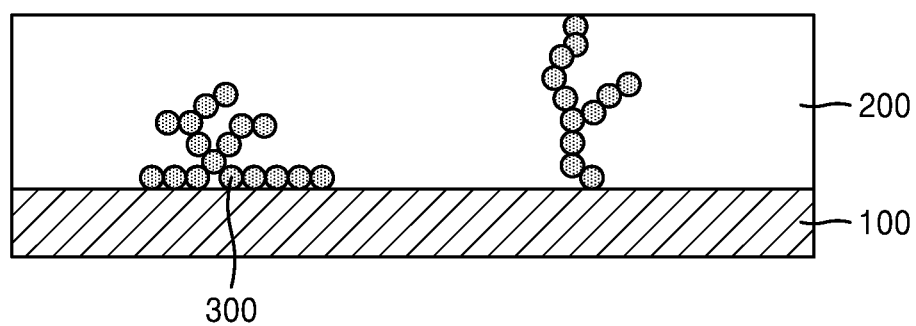
FIG. 1A is a diagram illustrating that an electron-conducting decomposition product is generated by a reduction chain reaction when a reference halide-based solid ion conductor as a solid electrolyte contacts a lithium-containing metal electrode.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain various aspects. As used herein, the term "and/or" includes any and all combinations of one or more of the associated listed items.

Hereinafter, a solid ion conductor according to one or more exemplary embodiments, a solid electrolyte and an electrochemical cell, including the solid electrolyte, and a method of preparing the solid ion conductor will be described in more detail with reference to the accompanying drawings. The followings are provided for illustrating the inventive concept and are not intended to limit the inventive concept, but the present concept is not limited thereto.

Expressions such as "at least one of," "at least one kind of," "one or more kinds of," or "one or more" when preceding a list of elements, modify the entire list of elements and do not modify the individual elements of the list. As used herein, the term "combinations" is inclusive of blends, mixtures, alloys, reaction products, and the like.

As used herein, the term "comprise" will be understood to imply the inclusion of an element but not the exclusion of any other elements, unless specially described to the contrary.

As used herein, the terms "first," "second," and the like, do not denote any order, quantity, or importance, but rather are used to distinguish one element from another. As used herein, the terms "a" and "an" and "the" do not denote a limitation of quantity, and are to be construed to cover both the singular and the plural, unless otherwise indicated herein or clearly contradicted by context. "Or" means "and/or," unless the content clearly indicates otherwise.

Reference throughout the specification to "one embodiment" or "an embodiment" means that a particular element described in connection with the embodiment is included in at least one embodiment and that it may be or may not be present in other embodiments. In addition, it should be understood that the particular element may be combined in any suitable manner in one or more embodiments.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference. While particular examples and embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

A solid ion conductor is used as a solid electrolyte. A solid electrolyte may not have higher ion conductivity than a liquid electrolyte. Therefore, when a solid electrolyte is used in an electrochemical device, such an electrochemical device can have poor charge and discharge characteristics at room temperature.

Among solid ion conductors, sulfide-based solid ion conductors and oxide-based solid ion conductors are being extensively researched. The sulfide-based solid ion conductor has excellent ion conductivity, but the chemical stability and electrochemical stability thereof are lowered due to gas generation and the like. The oxide-based solid ion conductor has excellent chemical stability but poor formability and ion conductivity, and can have poor charge-discharge characteristics when the oxide-based solid ion conductor is used in an electrochemical device. Accordingly, in order to compensate for such disadvantages, a process of crystallizing an oxide-based solid ion conductor at high temperatures of 1000° C. or higher is normally used.

Recently, a halide-based solid electrolyte is being researched as a solid ion conductor. A halide-based solid electrolyte may be molded simply by pressing without gas generation. As the halide-based solid electrolyte, Li$_3$InCl$_6$ or Li$_3$YCl$_6$ is widely used. However, a halide-based solid electrolyte, such as Li$_3$InCl$_6$ or Li$_3$YCl$_6$, still has an unsatisfactory ion conductivity. In addition, when a cell using the halide-based solid electrolyte is assembled, a central metal of the halide-based solid electrolyte can be reduced due to a contact with a lithium-containing metal electrode, leading to an increase in resistance or a decomposition product causing a short circuit.

To compensate for such limitations, the present inventors propose a solid ion conductor, a solid electrolyte and electrochemical cell comprising the same, and a method of preparing the solid ion conductor.

Hereinafter, a solid ion conductor, a solid electrolyte and electrochemical cell comprising the same, and a method of preparing the solid ion conductor will be described in detail.

Solid Ion Conductor

A solid ion conductor according to an embodiment may include a compound represented by Formula 1:

$$Li_aM_bM'_cX_dO_e \qquad \text{Formula 1}$$

wherein, in Formula 1,

M is one or more metals selected from Lu, Ho, Nd, Sm, Eu, Gd, Tb, Dy, Er, Tm, Yb, Ga, In, Ce, Pr, Ti, Zr, or Hf, which has an oxidation number of +3 or +4, M' is one or more metals selected from Na, K, Cs, Cu, or Ag, which has an oxidation number of +1, X is one or more halogens, $0<a<4$, $0.5<b<1.5$, $0\leq c<1.5$, $0<d<6.5$, and $0<e<1$.

The compound represented by Formula 1 may include a compound represented by Formula 2:

$$Li_aM_bM'_cCl_{d1}Br_{d2}F_{3}I_{d4}O_e \qquad \text{Formula 2}$$

wherein, in Formula 2,

M is one or more metals selected from Lu, Ho, Nd, Sm, Eu, Gd, Tb, Dy, Er, Tm, Yb, Ga, In, Ce, Pr, Ti, Zr, or Hf, which has an oxidation number of +3 or +4, M' is one or more metals selected from Na, K, Cs, Cu, or Ag, which has an oxidation number of +1, $0<a<4$, $0.5<b<1.5$, $0\leq c<1.5$, $0<d1<6.5$, $0<d2<6.5$, $0\leq d3<6.5$, $0\leq d4<6.5$, and $0<e<1$.

The compound is a halide-based solid ion conductor containing a metal having an oxidation number of +3 or +4 as the central element and having a portion of the halide substituted by oxygen. In addition, the compound is a halide-based solid ion conductor including a metal having an oxidation number of +3 or +4 as the central element, some of the halide is substituted with oxygen, and a metal having an oxidation number of +1 may occupying a portion of the Li sites. By having excellent ion conductivity and introducing oxygen thereto, the solid ion conductor may be used as a solid electrolyte for suppressing a chain reaction in which the central metal is reduced when contacting a lithium-containing metal electrode. When the solid ion conductor is used in an electrochemical device, the electrochemical device may exhibit excellent cycle stability with respect to a lithium-containing metal electrode and reversible cathode capacity.

While not wanting to be bound by theory, the reason why the compound of Formula 1 of the disclosure provides excellent cycle stability with a lithium-containing metal electrode in a cell, and reversible exhibition of designed cathode capacity, compared to a reference halide-based solid ion conductor, such as $Li_3InCl_6$ or $Li_3YCl_6$, will now be described in greater detail, which is provided for a better understanding of the present disclosure, but is not intended to limit the scope of the present disclosure.

Figure 1B:
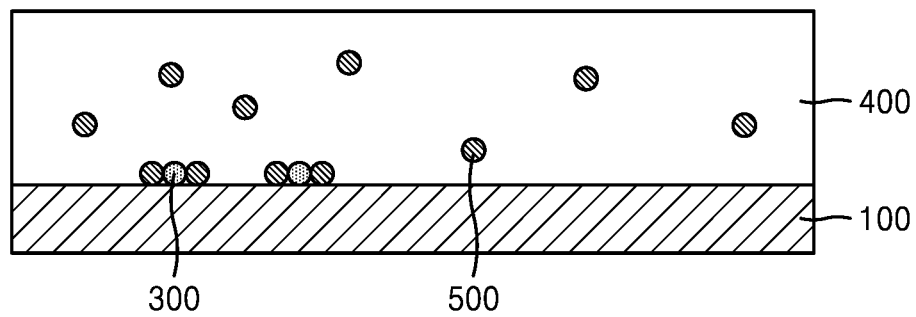
FIG. 1B is a diagram illustrating that a metal oxide suppressing a reduction reaction is generated when a halide-based solid ion conductor according to an embodiment of the disclosure as a solid electrolyte contacts a lithium-containing metal electrode.

FIG. 1A is a diagram illustrating that an electron-conducting decomposition product is generated by a reduction chain reaction when a reference halide-based solid ion conductor as a solid electrolyte contacts a lithium-containing metal electrode. FIG. 1B is a diagram illustrating that a metal oxide suppressing a reduction reaction is generated when a halide-based solid ion conductor according to an embodiment of the disclosure as a solid electrolyte contacts a lithium-containing metal electrode.

As shown in FIG. 1A, an electron-conducting decomposition product (M) 300 is generated by a reduction chain reaction taking place according to the following Reaction Formula 1 when the reference halide-based solid ion conductor solid electrolyte 200 as a solid electrolyte contacts a lithium-containing metal electrode 100:

$$Li_3MCl_6+3Li \rightarrow M+6LiCl \qquad \text{Reaction Formula 1}$$

wherein

M is a metal having an oxidation number of +3.

The electron-conducting decomposition product (M) is an electron conductor, and, when it contacts the lithium-containing metal electrode 100, a short circuit may occur. In addition, LiCl generated by the reduction is an insulator and may have increased resistance. When the reference halide-based solid ion conductor solid electrolyte 200 is used in a cell having a lithium-containing metal electrode, stable cycle operation and reversible exhibition of designed cathode capacity are difficult to achieve.

As shown in FIG. 1B, without wishing to be bound by theory, it is believed that when the halide-based solid ion conductor solid electrolyte 400 according to an embodiment of the disclosure contacts a lithium-containing metal electrode 100, generation of the electron-conducting decomposition product (M) 300 is suppressed, and a metal oxide ($M_2O$) 500 suppressing a reduction reaction is also generated by a reduction chain reaction taking place according to the following Reaction Formula 2:

$$2Li_3MCl_6+3Li_2O \rightarrow 12LiCl+M_2O_3 \qquad \text{Reaction Formula 2}$$

wherein

M is a metal having an oxidation number of +3.

The reduction reaction from the metal oxide ($M_2O$) 500 to a central element M is a spontaneous reaction according to the following Reaction Formula 3:

$$M_2O_3+6Li \rightarrow 2M+3Li_2O \qquad \text{Reaction Formula 3}$$

wherein

M is a metal having an oxidation number of +3.

For example, when M is Lu, $\Delta H=99$ kJ mol$^{-1}$.

Therefore, when the halide-based solid ion conductor solid electrolyte 400 according to an embodiment of the disclosure is used in a cell having a lithium-containing metal electrode, excellent cycle stability with respect to the lithium-containing metal electrode is provided, and reversible exhibition of designed cathode capacity, are obtained.

The compound may include a compound represented by Formula 3:

$$Li_aM_bM'_cX_dO_e \qquad \text{Formula 3}$$

wherein, in Formula 3,

M is one or more metals selected from Lu, Ho, Nd, Sm, Eu, Gd, Tb, Dy, Er, Tm, Yb, Ga, In, Ce, Pr, Ti, Zr, or Hf, which has an oxidation number of +3 or +4, M' is one or more metals selected from Na, K, Cs, Cu, or Ag, which has an oxidation number of +1, X is one or more selected from Cl or Br, $0<a<4$, $0.5<b<1.5$, $0\leq c<1.5$, $0<d<6.5$, $0<e<1$, and $0<e/b<0.5$.

When a mole ratio O/M, e.g., e/b in Formula 3, of the compound is greater than 0 and less than 0.5, e.g., $0<e/b<0.5$, $0.05<e/b<0.4$, or $0.1<e/b<0.3$, the compound may be used as a solid electrolyte while maintaining excellent ion conductivity.

The compound may include a compound represented by Formula 4:

$$Li_aM_bM'_cX_dO_e \qquad \text{Formula 4}$$

wherein, in Formula 4,

M is one or more metals selected from Lu, Ho, Nd, Sm, Eu, Gd, Tb, Dy, Er, Tm, Yb, Ga, In, Ce, Pr, Ti, Zr, or Hf, which has an oxidation number of +3 or +4, M' is one or more metals selected from Na, K, Cs, Cu, or Ag, which has an oxidation number of +1, X is one or more selected from Cl or Br, $0<a<4$, $0.5<b<1.5$, $0\leq c<1.5$, $0<d<6.5$, $0<e<1$, and $2\leq a/b\leq 6$.

For example, in Formula 4, $2\leq a/b\leq 4$.

When a mole ratio Li/M of the compound is 2 or greater and 6 or less, e.g., $2\leq a/b\leq 6$, $2.5\leq a/b\leq 5$, or $3\leq a/b\leq 4$, an improved content of Li cations distributed in the crystal structure of the compound may allow the compound to be used as a solid electrolyte while maintaining excellent ion conductivity.

For example, the compound includes a compound represented by Formula 5 or 6:

$$Li_pM_qX_{r-w}O_w \quad \text{Formula 5}$$

wherein, in Formula 5,

M is one or more metals selected from Lu, Ho, Nd, Sm, Eu, Gd, Tb, Dy, Er, Tm, Yb, Ga, In, Ce, Pr, Ti, Zr, or Hf, which has an oxidation number of +3, X is one or more selected from Cl or Br, $0<p<4$, $0.5<q<1.5$, $0<r<6.5$, $0<w<1$, and $0<w/q<0.5$;

$$Li_pM_qM'_zX_{r-w}O_w \quad \text{Formula 6}$$

wherein, in Formula 6,

M is one or more metals selected from Lu, Ho, Nd, Sm, Eu, Gd, Tb, Dy, Er, Tm, Yb, Ga, In, Ce, Pr, Ti, Zr, or Hf, which has an oxidation number of +3, M' is one or more metals selected from Na, K, Cs, Cu, or Ag, which has an oxidation number of +1, X is one or more selected from Cl or Br, $0<p<4$, $0.5<q<1.5$, $0<r<6.5$, $0<w<1$, and $2<p/q\leq 6$, $0<w/q<0.5$. For example, in Formula 6, $2<p/q\leq 4$.

Examples of the compound may include one or more selected from $Li_{3.6}Lu_{0.9}Cl_{5.7}O_{0.3}$, $Li_{3.6}Lu_{0.9}Cl_{1.7}Br_4O_{0.3}$, $Li_{3.6}Ho_{0.9}Cl_{5.7}O_{0.3}$, $Li_{3.6}Ho_{0.9}Cl_{1.7}Br_4O_{0.3}$, $Li_{3.6}Nd_{0.9}Cl_{5.7}O_{0.3}$, $Li_{3.6}Nd_{0.9}Cl_{1.7}Br_4O_{0.3}$, $Li_{3.6}Sm_{0.9}Cl_{5.7}O_{0.3}$, $Li_{3.6}Sm_{0.9}Cl_{1.7}Br_4O_{0.3}$, $Li_{3.6}Eu_{0.9}Cl_{5.7}O_{0.3}$, $Li_{3.6}Eu_{0.9}Cl_{1.7}Br_4O_{0.3}$, $Li_{3.6}Gd_{0.9}Cl_{5.7}O_{0.3}$, $Li_{3.6}Gd_{0.9}Cl_{1.7}Br_4O_{0.3}$, $Li_{3.6}Tb_{0.9}Cl_{5.7}O_{0.3}$, $Li_{3.6}Tb_{0.9}Cl_{1.7}Br_4O_{0.3}$, $Li_{3.6}Dy_{0.9}Cl_{5.7}O_{0.3}$, $Li_{3.6}Dy_{0.9}Cl_{1.7}Br_4O_{0.3}$, $Li_{3.6}Tm_{0.9}Cl_{5.7}O_{0.3}$, $Li_{3.6}Tm_{0.9}Cl_{1.7}Br_4O_{0.3}$, $Li_{3.6}Yb_{0.9}Cl_{5.7}O_{0.3}$, $Li_{3.6}Yb_{0.9}Cl_{1.7}Br_4O_{0.3}$, $Li_{3.6}Ga_{0.9}Cl_{5.7}O_{0.3}$, $Li_{3.6}Ga_{0.9}Cl_{1.7}Br_4O_{0.3}$, $Li_{3.6}In_{0.9}Cl_{5.7}O_{0.3}$, $Li_{3.6}In_{0.9}Cl_{1.7}Br_4O_{0.3}$;

$Li_{3.57}Na_{0.03}Lu_{0.9}Cl_{1.7}Br_4O_{0.3}$,
$Li_{3.57}Na_{0.03}Ho_{0.9}Cl_{1.7}Br_4O_{0.3}$,
$Li_{3.57}Na_{0.03}Nd_{0.9}Cl_{1.7}Br_4O_{0.3}$,
$Li_{3.57}Na_{0.03}Sm_{0.9}Cl_{1.7}Br_4O_{0.3}$,
$Li_{3.57}Na_{0.03}Eu_{0.9}Cl_{1.7}Br_4O_{0.3}$,
$Li_{3.57}Na_{0.03}Gd_{0.9}Cl_{1.7}Br_4O_{0.3}$,
$Li_{3.57}Na_{0.03}Tb_{0.9}Cl_{1.7}Br_4O_{0.3}$,
$Li_{3.57}Na_{0.03}Dy_{0.9}Cl_{1.7}Br_4O_{0.3}$,
$Li_{3.57}Na_{0.03}Tm_{0.9}Cl_{1.7}Br_4O_{0.3}$,
$Li_{3.57}Na_{0.03}Yb_{0.9}Cl_{1.7}Br_4O_{0.3}$,
$Li_{3.57}Na_{0.03}Ga_{0.9}Cl_{1.7}Br_4O_{0.3}$,
$Li_{3.57}Na_{0.03}Tm_{0.9}Cl_{1.7}Br_4O_{0.3}$;

$Li_{3.57}K_{0.03}Lu_{0.9}Cl_{1.7}Br_4O_{0.3}$,
$Li_{3.57}K_{0.03}Ho_{0.9}Cl_{1.7}Br_4O_{0.3}$, $Li_{3.57}K_{0.03}Nd_{0.9}Cl_{1.7}Br_4O_{0.3}$,
$Li_{3.57}K_{0.03}Sm_{0.9}Cl_{1.7}Br_4O_{0.3}$, $Li_{3.57}K_{0.03}Eu_{0.9}Cl_{1.7}Br_4O_{0.3}$,
$Li_{3.57}K_{0.03}Gd_{0.9}Cl_{1.7}Br_4O_{0.3}$, $Li_{3.57}K_{0.03}Tb_{0.9}Cl_{1.7}Br_4O_{0.3}$,
$Li_{3.57}K_{0.03}Dy_{0.9}Cl_{1.7}Br_4O_{0.3}$, $Li_{3.57}K_{0.03}Tm_{0.9}Cl_{1.7}Br_4O_{0.3}$,
$Li_{3.57}K_{0.03}Yb_{0.9}Cl_{1.7}Br_4O_{0.3}$, $Li_{3.57}K_{0.03}Ga_{0.9}Cl_{1.7}Br_4O_{0.3}$,
$Li_{3.57}K_{0.03}In_{0.9}Cl_{1.7}Br_4O_{0.3}$;

$Li_{3.57}Cs_{0.03}Lu_{0.9}Cl_{1.7}Br_4O_{0.3}$,
$Li_{3.57}Cs_{0.03}Ho_{0.9}Cl_{1.7}Br_4O_{0.3}$,
$Li_{3.57}Cs_{0.03}Nd_{0.9}Cl_{1.7}Br_4O_{0.3}$,
$Li_{3.57}Cs_{0.03}Sm_{0.9}Cl_{1.7}Br_4O_{0.3}$,
$Li_{3.57}Cs_{0.03}Eu_{0.9}Cl_{1.7}Br_4O_{0.3}$,
$Li_{3.57}Cs_{0.03}Gd_{0.9}Cl_{1.7}Br_4O_{0.3}$,
$Li_{3.57}Cs_{0.03}Tb_{0.9}Cl_{1.7}Br_4O_{0.3}$,
$Li_{3.57}Cs_{0.03}Dy_{0.9}Cl_{1.7}Br_4O_{0.3}$,
$Li_{3.57}Cs_{0.03}Tm_{0.9}Cl_{1.7}Br_4O_{0.3}$,
$Li_{3.57}Cs_{0.03}Yb_{0.9}Cl_{1.7}Br_4O_{0.3}$,
$Li_{3.57}Cs_{0.03}Ga_{0.9}Cl_{1.7}Br_4O_{0.3}$,
$Li_{3.57}Cs_{0.03}In_{0.9}Cl_{1.7}Br_4O_{0.3}$;

$Li_{3.57}Cu_{0.03}Lu_{0.9}Cl_{1.7}Br_4O_{0.3}$,
$Li_{3.57}Cu_{0.03}Ho_{0.9}Cl_{1.7}Br_4O_{0.3}$,
$Li_{3.57}Cu_{0.03}Nd_{0.9}Cl_{1.7}Br_4O_{0.3}$,
$Li_{3.57}Cu_{0.03}Sm_{0.9}Cl_{1.7}Br_4O_{0.3}$,
$Li_{3.57}Cu_{0.03}Eu_{0.9}Cl_{1.7}Br_4O_{0.3}$,
$Li_{3.57}Cu_{0.03}Gd_{0.9}Cl_{1.7}Br_4O_{0.3}$,
$Li_{3.57}Cu_{0.03}Tb_{0.9}Cl_{1.7}Br_4O_{0.3}$,
$Li_{3.57}Cu_{0.03}Dy_{0.9}Cl_{1.7}Br_4O_{0.3}$,
$Li_{3.57}Cu_{0.03}Tm_{0.9}Cl_{1.7}Br_4O_{0.3}$,
$Li_{3.57}Cu_{0.03}Yb_{0.9}Cl_{1.7}Br_4O_{0.3}$,
$Li_{3.57}Cu_{0.03}Ga_{0.9}Cl_{1.7}Br_4O_{0.3}$,
$Li_{3.57}Cu_{0.03}In_{0.9}Cl_{1.7}Br_4O_{0.3}$;

$Li_{3.57}Ag_{0.03}Lu_{0.9}Cl_{1.7}Br_4O_{0.3}$,
$Li_{3.57}Ag_{0.03}Ho_{0.9}Cl_{1.7}Br_4O_{0.3}$,
$Li_{3.57}Ag_{0.03}Nd_{0.9}Cl_{1.7}Br_4O_{0.3}$,
$Li_{3.57}Ag_{0.03}Sm_{0.9}Cl_{1.7}Br_4O_{0.3}$,
$Li_{3.57}Ag_{0.03}Eu_{0.9}Cl_{1.7}Br_4O_{0.3}$,
$Li_{3.57}Ag_{0.03}Gd_{0.9}Cl_{1.7}Br_4O_{0.3}$,
$Li_{3.57}Ag_{0.03}Tb_{0.9}Cl_{1.7}Br_4O_{0.3}$,
$Li_{3.57}Ag_{0.03}Dy_{0.9}Cl_{1.7}Br_4O_{0.3}$,
$Li_{3.57}Ag_{0.03}Tm_{0.9}Cl_{1.7}Br_4O_{0.3}$,
$Li_{3.57}Ag_{0.03}Yb_{0.9}Cl_{1.7}Br_4O_{0.3}$,
$Li_{3.57}Ag_{0.03}Ga_{0.9}Cl_{1.7}Br_4O_{0.3}$,
$Li_{3.57}Ag_{0.03}In_{0.9}Cl_{1.7}Br_4O_{0.3}$; or $Li_{3.2}LuCl_6O_{0.1}$, $Li_{3.2}HoCl_6O_{0.1}$, $Li_{3.2}NdCl_6O_{0.1}$, $Li_{3.2}SmCl_6O_{0.1}$, $Li_{3.2}EuCl_6O_{0.1}$, $Li_{3.2}GdCl_6O_{0.1}$, $Li_{3.2}TbCl_6O_{0.1}$, $Li_{3.2}DyCl_6O_{0.1}$, $Li_{3.2}ErCl_6O_{0.1}$, $Li_{3.2}TmCl_6O_{0.1}$, $Li_{3.2}YbCl_6O_{0.1}$, $Li_{3.2}GaCl_6O_{0.1}$, $Li_{3.2}InCl_6O_{0.1}$, $Li_{3.2}CeCl_6O_{0.1}$, or $Li_{3.2}PrCl_6O_{0.1}$.

Figure 2A:
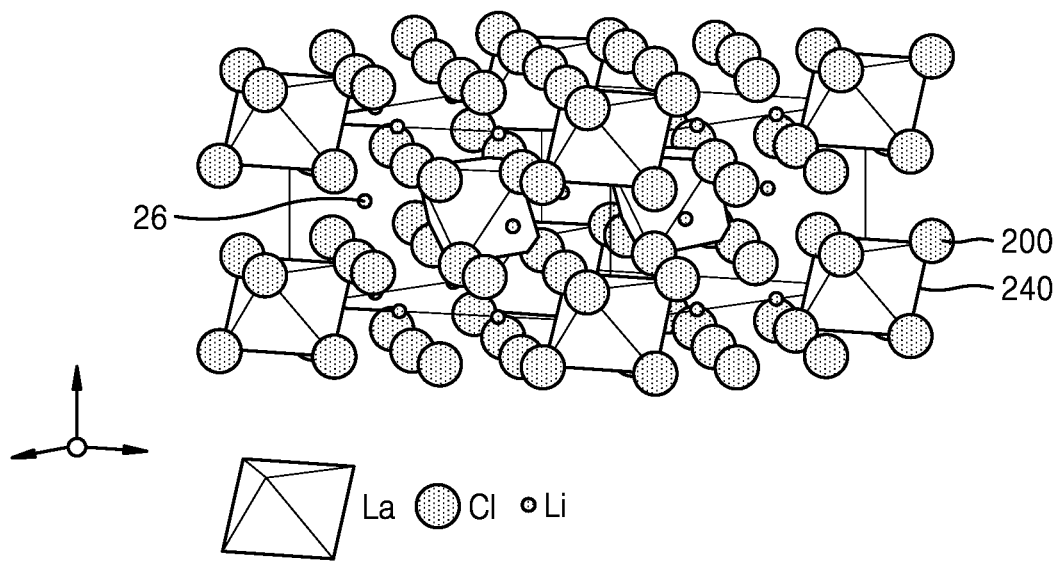
FIG. 2A is a schematic diagram illustrating an embodiment of a crystal structure of a solid ion conductor compound.
Figure 2B:
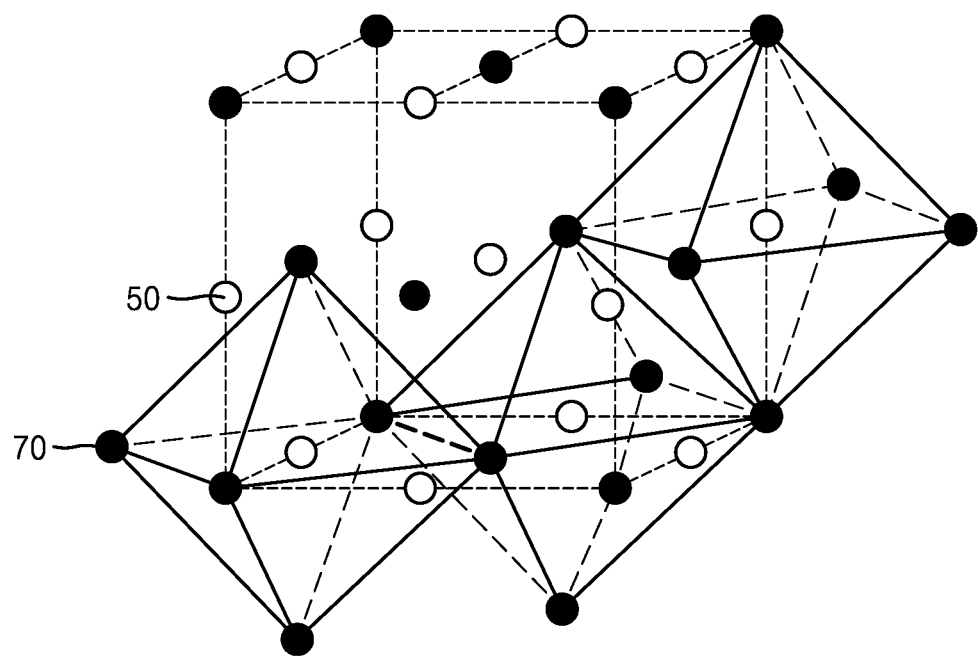
FIG. 2B is a schematic diagram illustrating units in the crystal structure of and embodiment of a solid ion conductor compound.

FIG. 2A is a schematic diagram illustrating a crystal structure of an embodiment of a solid ion conductor compound. FIG. 2B is a schematic diagram illustrating a unit cell in the crystal structure of an embodiment of a solid ion conductor compound.

As shown in FIGS. 2A and 2B, the solid ion conductor compound according to an embodiment has a distorted rock-salt type crystal structure. A rock-salt-type crystal structure is a type of ionic crystal structure in which the cations have a face-centered cubic arrangement, with anions occupying all the octahedral holes. It can also be described as a fcc array of anions with cations in the octahedral holes. In a distorted rock-salt-type crystal structure, one or more atoms depart from their positions in an ideal rock-salt-type crystal structure.

The compound has a crystal structure comprising metal M 50 centered octahedra, in which X halogens 70 are located at edges of the $MX_6$ octahedra, and oxygens occupy a portion of the halogen sites 70. The octahedra are located in an edge-sharing manner. For example, as shown in FIG. 2A, M may be La and the halogen X may be Cl 200 to provide La centered $LaCl_6$ octahedra 240. The crystal structure of the compound can have a layered crystal structure in which $Li^+$ 26 and a metal M' substituted for some of the $Li^+$, where M' is other than lithium and has an oxidation number of +1, is located around the octahedra. The $Li^+$ may have an ionic bond, e.g., to provide LiCl, according to the distance from $Cl^-$. While not wanting to be bound by theory, it is understood that by substituting the Li$^+$ site with the metal (M') cation having a greater radius than a Li$^+$ ion, a space in which the Li$^+$ ion may more freely move is obtained, and thus the compound may have a three dimensional lithium ion movement channel in x-, y-, and z-axis directions, and this region may be other than or between the MX$_6$ octahedra in the crystal structure. The compound may have a lithium ion movement channel which is three-dimensionally connected in the crystal structure. As a result, the compound is considered to have excellent lithium ion conductivity.

The solid ion conductor may have an ion conductivity of $1.0\times10^{-5}$ mS·cm$^{-1}$ or greater at 25° C. For example, the solid ion conductor may have ion conductivity of $1.2\times10^{-5}$ millisiemens per centimeter (mS·cm$^{-1}$) or greater at 25° C., or an ion conductivity of $1.4\times10^{-5}$ mS·cm$^{-1}$ or greater, $1.6\times10^{-5}$ mS·cm$^{-1}$ or greater, $1.8\times10^{-5}$ mS·cm$^{-1}$ or greater, or $2.0\times10^{-5}$ mS·cm$^{-1}$ or greater at 25° C. The solid ion conductor may have an ion conductivity of about $1\times10^{-5}$ S/cm to about $5\times10^{-2}$ S/cm, about $1\times10^{-5}$ S/cm to about $1\times10^{-2}$ S/cm, about $1.2\times10^{-5}$ S/cm to about $0.5\times10^{-2}$ S/cm, or about $1.5\times10^{-5}$ S/cm to about to about $1\times10^{-3}$ S/cm. The ionic conductivity of the solid ion conductor can be measured by electrochemical impedance spectroscopy (EIS). See, for example, J.-M. Winand et al., "Measurement of Ionic Conductivity in Solid Electrolytes," Europhysics Letters, vol. 8, no. 5, p. 447-452, 1989, the content of which is included herein by reference.

Solid Electrolyte and Electrochemical Device

A solid electrolyte according to another embodiment may include the solid ion conductor. The solid electrolyte may further comprise one or more of an oxide solid electrolyte, or a sulfide solid electrolyte. Also, the solid electrolyte may be in the form of a layer to provide a solid electrolyte layer. The solid electrolyte layer may have a thickness that is less than 0.1 times a width or length of the layer, e.g., a thickness that is $1\times10^{-6}$ to 0.1 times a width or length of the layer.

The solid electrolyte may be electrochemically stable between 0.6 volt and 4.3 volts versus Li/Li$^+$. "Electrochemical stable" means that the solid electrolyte is neither oxidized or reduced at the recited potential and in contact with lithium. An electrochemical stability window for a solid electrolyte can be evaluated using cyclic voltammetry using a symmetric cell wherein the solid electrolyte is between lithium metal electrodes.

An electrochemical device according to another embodiment may include a cathode layer, an anode layer, and a solid electrolyte layer disposed between the cathode layer and the anode layer, and may include the above-mentioned solid electrolyte.

The solid electrolyte may be included in the solid electrolyte layer, the cathode layer, the anode layer, a protection film on the cathode layer, or a protection film on the anode layer, or a combination thereof of an electrochemical device.

The cathode layer may include a cathode active material, and the cathode active material may be one or more selected from a lithium transition metal oxide, a lithium transition metal phosphate, or a sulfide, and the cathode layer may optionally comprise the solid electrolyte.

For example, the cathode active material may be prepared using a lithium cobalt oxide (referred to as LCO, hereinafter), a lithium nickel oxide, a lithium nickel cobalt oxide, a lithium nickel cobalt aluminum oxide (referred to as NCA, hereafter), a lithium nickel cobalt manganese oxide (referred to as NCM, hereafter), a lithium manganate, a lithium iron phosphate, a nickel sulfide, a copper sulfide, a lithium sulfide, an iron oxide, or a vanadium oxide. Such cathode active materials may be used alone or a combination of two or more thereof. For example, the cathode active material may be a lithium salt of a ternary transition metal oxide, such as LiNi$_x$Co$_y$Al$_z$O$_2$ (NCA) or LiNi$_x$Co$_y$Mn$_z$O$_2$ (NCM), where $0<x<1$, $0<y<1$, $0<z<1$, and $x+y+z=1$.

The cathode active material may have a coating layer formed thereon. Any suitable coating layer that is used as a coating layer for a cathode active material of an all-solid secondary battery may be used. For example, Li$_2$O—ZrO$_2$ may be used as the coating layer.

In addition, when the cathode active material includes a lithium salt of a ternary transition metal oxide, such as NCA or NCM, or nickel (Ni), an electrochemical device may have an increased capacity density, and may have reduced elution of metal in the cathode active material in a charged state. The electrochemical device may have improved long-term reliability and cycle characteristic in a charged state.

The shape of the cathode active material may be, for example, an elliptical or a spherical particle shape. In addition, the particle size of the cathode active material is not limited and may be in a range applicable to the cathode active material of an electrochemical device, for example, an all-solid secondary battery. The amount of the cathode active material of the cathode layer 10 is not limited, either, and may be in a range applicable to a cathode layer of an all-solid secondary battery.

The anode layer may include a lithium metal or a lithium alloy.

Examples of the lithium alloy may include alloys of lithium with one or more selected from indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), silver (Ag), or zinc (Zn). However, the alloys are not limited to those listed herein and any metal or metalloid capable of forming an alloy with lithium may be used.

A reduction voltage of the solid electrolyte relative to a lithium metal may be 0 V or less. A reduction voltage can be determined by cyclic voltammetry.

A zero voltage (0 V) reduction current of the solid electrolyte relative to a lithium metal may be 0.1 mA/cm$^2$ or less. A zero voltage reduction current can be determined by cyclic voltammetry.

The solid electrolyte may have excellent cycle stability with respect to a lithium-containing metal electrode and reversible exhibition of designed cathode capacity.

The solid electrolyte may include one or more solid electrolytes selected from the solid ion conductor, an oxide solid electrolyte, or a sulfide-based solid electrolyte, and may be in the form of a layer to provide a solid electrolyte layer. O The sulfide-based solid electrolyte may include a solid electrolyte represented by Formula 7:

$$\mathrm{Li^+}_{12-n-z}\mathrm{A}^{n+}\mathrm{Q}^{2-}_{6-z}\mathrm{Y'}^-_z \qquad \text{Formula 7}$$

wherein, in Formula 7,

A may be P, As, Ge, Ga, Sb, Si, Sn, Al, In, Tl, V, Nb, or Ta,

Q may be one or more selected from S, Se, or Te,

Y' may be one or more selected from Cl, Br, I, F, CN, OCN, SCN, or N$_3$, $1<n<5$, and $0<z<2$.

The sulfide-based solid ion conductor may be an argyrodite-type compound including one or more selected from Li$_{7-x}$PS$_{6-x}$Cl$_x$ (where $0\leq x\leq 2$), Li$_{7-x}$PS$_{6-x}$Br$_x$ (where $0\leq x\leq 2$), or Li$_{7-x}$PS$_{6-x}$I$_x$ (where $0\leq x\leq 2$). For example, the sulfide-based solid ion conductor may be an argyrodite-type compound including one or more selected from $Li_6PS_5Cl$, $Li_6PS_5Br$, or $Li_6PS_5I$.

Optionally, the sulfide-based solid ion conductor may include one or more selected from $Li_2S$—$P_2S_5$, $Li_2S$—$P_2S_5$—LiX (where X is a halogen element), $Li_2S$—$P_2S_5$—$Li_2O$, $Li_2S$—$P_2S_5$—$Li_2O$—LiI, $Li_2S$—$SiS_2$, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are a positive integer, and Z is one of Ge, Zn, and Ga), $Li_2S$—$GeS_2$, $Li_2S$—$SiS_2$—$Li_3PO_4$, or $Li_2S$—$SiS_2$—$Li_pMO_q$ (where p and q are a positive integer, and M is one of P, Si, Ge, B, Al, Ga, and In). For example, the sulfide-based solid ion conductor may include $Li_2S$—$P_2S_5$. When $Li_2S$—$P_2S_5$ is used as the sulfide-based solid ion conductor, a mixing molar ratio of $Li_2S$ and $P_2S_5$, that is, $Li_2S$:$P_2S_5$ may be in a range of, for example, about 50:50 to about 90:10.

The oxide-based solid ion conductor may include one or more selected from a garnet-based ceramic of the formula $Li_{3+x}La_3M_2O_{12}$ (where M is Te, Nb, or Zr, and x is an integer of 1 to 10), lithium phosphorus oxynitride ($Li_xPO_yN_z$) (where $0<x<1$, $0<y<1$, and $0<z<1$), lithium phosphorus oxynitride (LiPON), $Li_xP_yO_zN_k$ (where $2.7 \leq x \leq 3.3$, $0.8 \leq y \leq 1.2$, $3.5 \leq z \leq 3.9$, and $0.1 \leq k \leq 0.5$), $Li_wPO_xN_yS_z$ ($0<w<1$, $0<x<1$, $0<y<1$, $0<z<1$), $Li_{1+x+y}Al_xTi_{2-x}Si_yP_{3-y}O_{12}$ ($0<x<2$, $0 \leq y<3$), $BaTiO_3$, $Pb(Zr_xTi_{1-x})O_3$ (PZT) ($0 \leq x \leq 1$), $Pb_{1-x}La_xZr_{1-y}Ti_yO_3$(PLZT) ($0 \leq x<1$, $0 \leq y<1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, SiC, lithium phosphate ($Li_3PO_4$), lithium titanium phosphate($Li_xTi_y(PO_4)_3$ (where $0<x<2$ and $0<y<3$), lithium aluminum titanium phosphate($Li_xAl_yTi_z(PO_4)_3$ (where $0<x<2$, $0<y<1$, and $0<z<3$), $Li_{1+x+y}(Al_aGa_{1-a})_x(Ti_bGe_{1-b})_{2-x}Si_yP_{3-y}O_{12}$ (where $0 \leq x \leq 1$, $0 \leq y \leq 1$, $0 \leq a \leq 1$, $0 \leq b \leq 1$), lithium lanthanum titanate ($Li_xLa_yTiO_3$) (where $0<x<2$ and $0<y<3$), lithium germanium thio phosphate ($Li_xGe_yP_zS_w$) (where $0<x<4$, $0<y<1$, $0<z<1$, and $0<w<5$), lithium nitride-based glass ($Li_xN_y$) (where $0<x<4$ and $0<y<2$), $SiS_2(Li_xSi_yS_z)$ (where $0<x<3$, $0<y<2$, and $0<z<4$), $P_2S_5$-based glass ($Li_xP_yS_z$) (where $0<x<3$, $0<y<3$, and $0<z<7$), $Li_2O$, LiF, LiOH, $Li_2CO_3$, $LiAlO_2$, $Li_2O$—$Al_2O_3$—$SiO_2$—$P_2O_5$—$TiO_2$—$GeO_2$-based ceramics, or garnet-based ceramics $Li_{3+x}La_3M_2O_{12}$ (where M is Te, Nb, or Zr, and x is an integer of 1 to 10). For example, the oxide-based solid ion conductor may use a garnet-based oxide-based solid electrolyte demonstrating excellent reduction stability when contacting a lithium anode. Garnet-based ceramics $Li_{3+x}La_3M_2O_{12}$ (where M is Te, Nb, or Zr), for example, LLZO ($Li_{6.5}La_3Zr_{1.5}Ta_{0.5}O_{12}$), may be used as the garnet-based oxide-based solid electrolyte.

The solid electrolyte may further include a binder. For example, the binder included in the solid electrolyte may include one or more selected from styrene butadiene rubber (SBR), polytetrafluoroethylene, polyvinylidene fluoride, or polyethylene. However, the binder is not limited to those listed herein and any binder that is used in the art may be suitably used.

Optionally, the solid electrolyte may further include an organic solid electrolyte. The organic solid electrolyte may include one or more polymers selected from a polyethylene derivative, a polyethylene oxide derivative, a polypropylene oxide derivative, a phosphoric acid ester polymer, a polylysine, polyester sulfide, polyvinyl alcohol, polyvinylidene fluoride, or a polymer having an ionic dissociation group. Optionally, the solid electrolyte may further include an amorphous solid electrolyte. The solid electrolyte may include a mixed solid electrolyte having a crystalline solid electrolyte and an amorphous solid electrolyte mixed therein. Optionally, the solid electrolyte may further include a lithium salt or/and an ionic liquid.

Optionally, the solid electrolyte may further include an ion-conducting inorganic material.

The ion-conducting inorganic material may include, but not limited to, one or more selected from a glass or amorphous metal ion conductor, a ceramic active metal ion conductor, a glass ceramic active metal ion conductor, or any material that is used in the art may be suitably used as the ion-conducting inorganic material. The ion-conducting inorganic material may be in the form of, for example, ion-conducting inorganic particles or a sheet thereof.

The ion-conducting inorganic material may include, for example, one or more selected from $BaTiO_3$, $Pb(Zr_aTi_{1-a})O_3$ (PZT, wherein $0 \leq a \leq 1$), $Pb_{1-x}La_xZr_{1-y}Ti_yO_3$ (PLZT) (where $0 \leq x<1$ and $0 \leq y<1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$) (where $0<x<2$ and $0<y<3$), lithium aluminum titanium phosphate ($Li_xAl_yTi_z(PO_4)_3$) (where $0<x<2$, $0<y<1$, and $0<z<3$), $Li_{1+x+y}(Al_aGa_{1-a})_x(Ti_bGe_{1-b})_{2-x}Si_yP_{3-y}O_{12}$ (where $0 \leq x \leq 1$, $0 \leq y \leq 1$, $0 \leq a \leq 1$, $0 \leq b \leq 1$), lithium lanthanum titanate ($Li_xLa_yTiO_3$) (where $0<x<2$ and $0<y<3$), lithium germanium thiophosphate ($Li_xGe_yP_zS_w$) (where $0<x<4$, $0<y<1$, $0<z<1$, and $0<w<5$), lithium nitride ($Li_xN_y$) (where $0<x<4$ and $0<y<2$), $SiS_2(Li_xSi_yS_z)$ (where $0<x<3$, $0<y<2$, and $0<z<4$)-based glass, $P_2S_5(Li_xP_yS_z)$ (where $0<x<3$, $0<y<3$, and $0<z<7$)-based glass, $Li_2O$, LiF, LiOH, $Li_2CO_3$, $LiAlO_2$, $Li_2O$—$Al_2O_3$—$SiO_2$—$P_2O_5$—$TiO_2$—$GeO_2$-based ceramics, or garnet-based ceramics ($Li_{3+x}La_3M_2O_{12}$) (where M is Te, Nb, or Zr).

The solid electrolyte may be in the form of a powder or a molding product. The solid electrolyte of the molding product may have a shape of, for example, a pellet, a sheet or a thin film, but not limited thereto, and may have a variety of shapes according to uses.

The solid electrolyte layer may have a thickness of about 10 micrometers (μm) to about 1 millimeter (mm). The solid electrolyte layer may have a single layered structure or a multilayered structure of two or more layers.

In an example embodiment, the solid electrolyte may include a solid ion conductor including the compound represented by Formula 1 in the solid electrolyte layer alone. In another example embodiment, the solid electrolyte layer may include, in addition to the solid ion conductor, at least one selected from an oxide-based solid ion conductor or a sulfide-based solid ion conductor, either in the same layer as the layer that contains the solid ion conductor, or in a separate layer that does not contain the solid ion conductor.

In an example embodiment, the solid electrolyte may include a solid ion conductor including the compound represented by Formula 1 as the cathode layer or/and the anode layer alone. Alternately, the cathode layer or/and anode layer may include, in addition to the solid ion conductor, a separate single structure or multilayered structure of a sulfide-based solid ion conductor, an oxide-based solid ion conductor solid electrolyte or/and an ionic liquid containing electrolyte. In an example embodiment, the electrochemical device may include a cathode layer, an ionic liquid containing electrolyte, an oxide-based solid ion conductor solid electrolyte (or a sulfide-based solid ion conductor solid electrolyte), the solid ion conductor solid electrolyte containing the compound represented by the Formula 1, an oxide-based solid ion conductor solid electrolyte (or a sulfide-based solid ion conductor solid electrolyte), and an anode layer, disposed in that order.

The electrochemical device may be an all-solid secondary battery or a metal air battery. However, the kind of the electrochemical device is not limited to those listed herein, and any electrochemical device that is useful in the art may be used.

For example, the electrochemical device may be an all-solid secondary battery.

Figure 3:
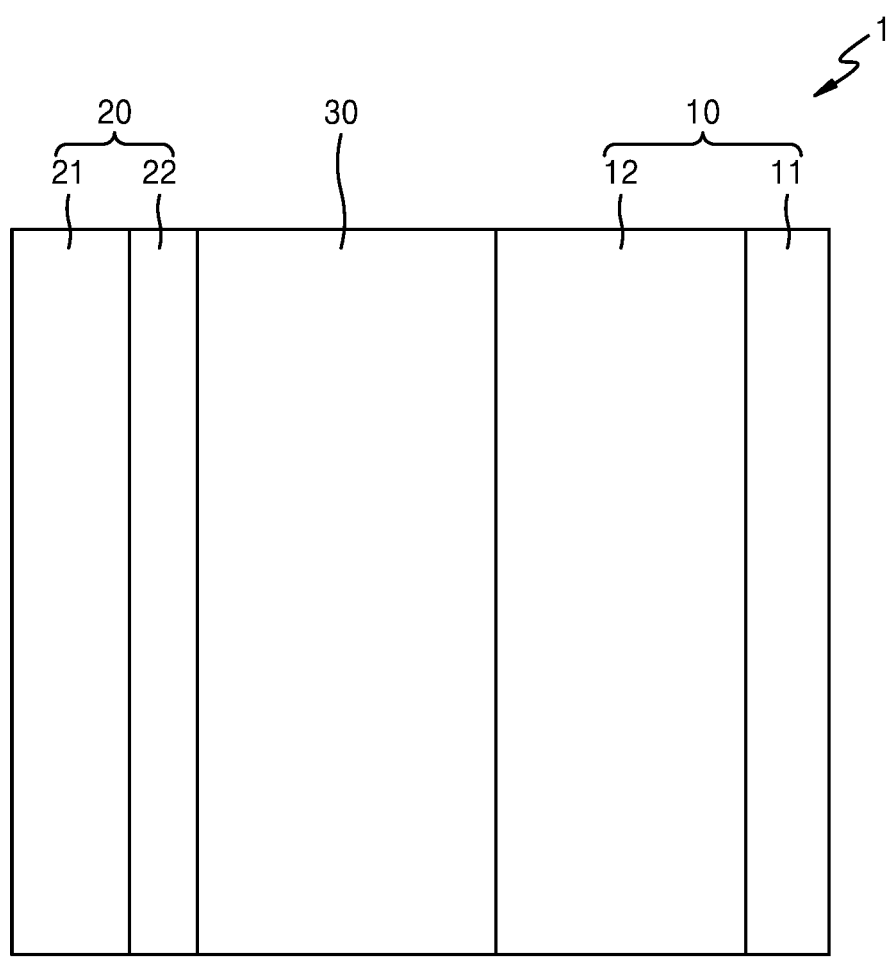
FIGS. 3 to 5 are cross-sectional views of an embodiment of an all-solid secondary battery.
Figure 4:
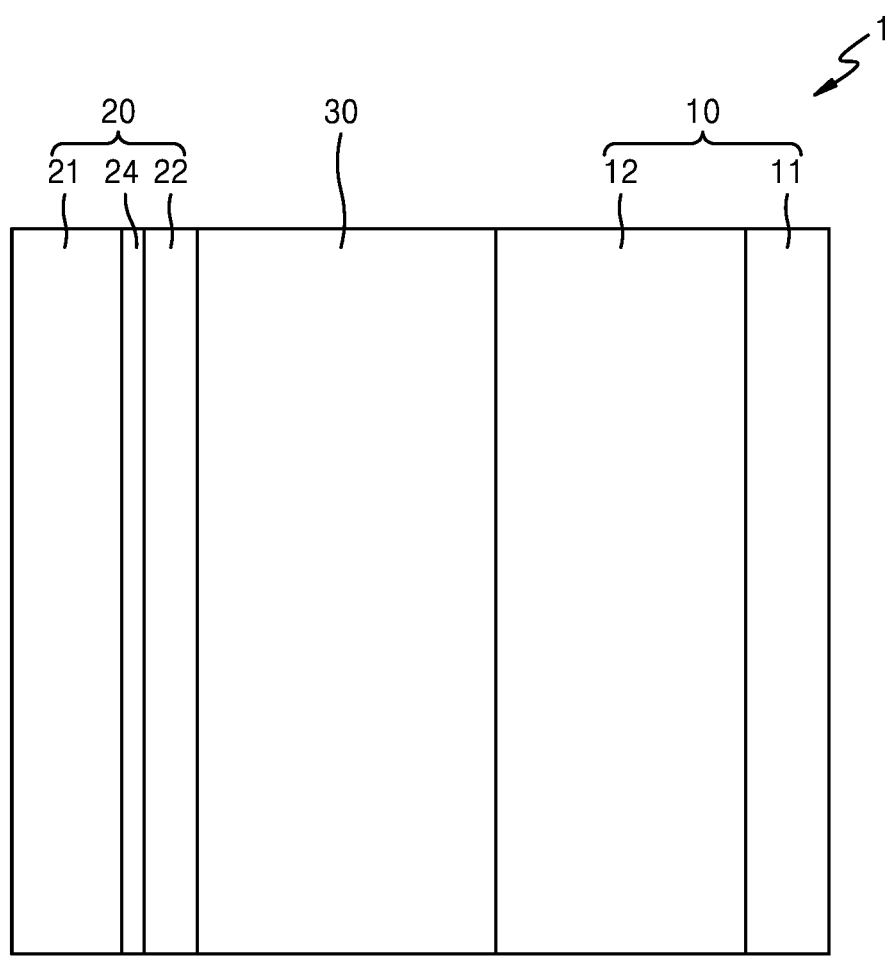
Figure 5:
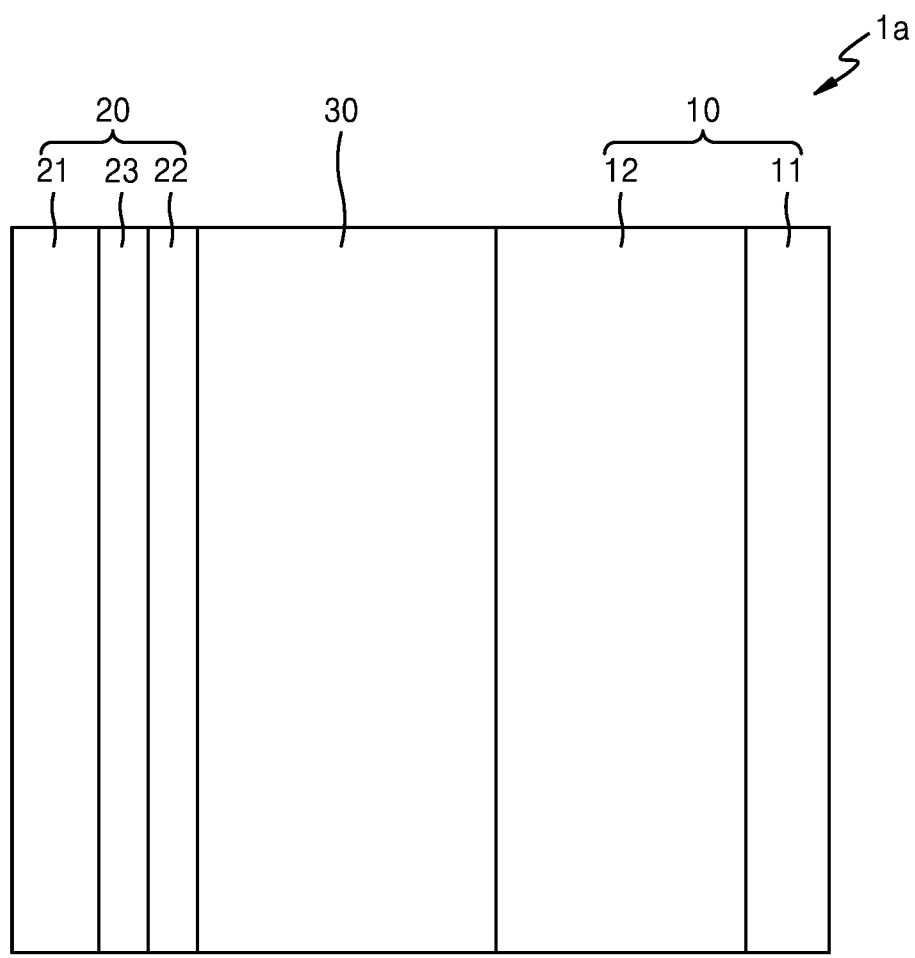

FIGS. 3 to 5 are cross-sectional views of an all-solid secondary battery according to an embodiment.

Referring to FIGS. 3 to 5, the all-solid secondary battery 1 includes: a cathode layer 10 including a cathode current collector 11 and a cathode active material layer 12; an anode layer 20; and a solid electrolyte layer 30 disposed between the cathode layer 10 and the anode layer 20, wherein the anode layer 20 includes an anode current collector 21, and an anode active material layer 22 disposed on the anode current collector 21, and the anode active material layer 22 includes a lithium metal or an anode active material forming an alloy with lithium. In the all-solid secondary battery 1, one or more of the cathode layer 10, the anode layer 20, and the solid electrolyte layer 30, may include the solid ion conductor including the compound represented by the Formula 1.

The cathode current collector 11 may be in the form of, for example, a plate or a foil including indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. The cathode current collector 11 may not be used.

The cathode active material layer 12 may include the cathode active material or/and solid electrolyte. The solid electrolyte included in the cathode layer 10 may be the same as or different from the solid ion conductor included in the solid electrolyte layer 30.

The cathode layer 10 may further include an ion-conducting inorganic material. Kinds of the ion-conducting inorganic material are the same as those described above for the ion-conducting inorganic material in the solid electrolyte, and thus descriptions thereof will not be given.

The cathode layer 10 may include additives, for example, a conductive agent, a binder, a filler, a dispersant, an ion-conducting additives, etc., which are appropriately combined with the cathode active material or/and the solid electrolyte.

As the conductive agent that may be combined with the cathode layer 10, one or more selected from graphite, carbon black, acetylene black, Ketjen black, carbon fiber, or metal powder, may be used. Examples of the combinable binder may include one or more selected from styrene butadiene rubber (SBR), polytetrafluoroethylene, polyvinylidene fluoride, or polyethylene. As the coating agent, dispersant, or ion-conducting additives that may be combined with the cathode layer 10, known materials used as an electrode of an all-solid secondary battery in the art may be used.

The anode layer 20 may include an anode current collector 21 and an anode active material layer 22.

Materials constituting the anode current collector 21, may include one or more selected from copper (Cu), stainless steel, titanium (Ti), iron (Fe), cobalt (Co), or nickel (Ni). The anode current collector 21 may include one or two or more kinds of an alloy, or a coating material of metals of the above-described metals. The anode current collector 21 may have, for example, a plate shape or a foil shape.

The anode active material layer 22 may include the lithium metal or the lithium alloy. Optionally, the anode active material layer 22 may include a carbon-based anode active material, or an anode active material in which a lithium metal or a lithium alloy is combined with a carbon-based anode active material. Examples of the lithium alloy are the same as described above.

The carbon-based anode active material may include one or more selected from graphite, carbon black (CB), acetylene black (AB), furnace black (FB), ketjen black (KB), graphene, carbon nanotube, or carbon nanofiber.

The anode active material layer 22 may include additives, for example, one or more selected from a conductive agent, a binder, a filler, a dispersant, or an ion-conducting additives, etc., which are appropriately combined with the anode active material.

Optionally, the anode active material layer 22 may be an anodeless coating layer. For example, the anodeless coating layer may have a structure in which a metal, such as silicon, and carbon are provided, and a conductive binder is disposed around the metal and carbon. A thickness of the anodeless coating layer may be about 1 μm to about 20 μm, about 2 to about 15 μm, or about 4 to about 12 μm.

The solid electrolyte layer 30 may be prepared by deposition using a known film forming process, for example, aerosol deposition, cold spray, or sputtering. Alternatively, the solid electrolyte layer 30 may be prepared by pressing solid electrolyte single particles. Alternatively, the solid electrolyte layer 30 may be prepared by mixing a solid electrolyte, a solvent, and a binder, coating, drying and pressing.

As shown in FIG. 4, a thin film 24 may be formed on a surface of the anode current collector 21. The thin film 24 may include an element capable of forming an alloy with lithium. Examples of the element capable of forming an alloy with lithium may include gold, silver, zinc, tin, indium, silicon, aluminum, or bismuth. The thin film 24 may include one of these metals or include an alloy of several kinds of metals. By including the thin film 24, the metal layer 23 shown in FIG. 5 may further planarize a precipitation form thereof, and the all-solid secondary battery 1 may have further improved battery performance characteristics.

A thickness of the thin film 24 may be, for example, about 1 nm to about 500 nm, about 50 nm to about 450 nm, about 100 nm to about 400 nm, or about 150 nm to about 350 nm, but not limited thereto. When the thickness of the thin film 24 is in the above range, the all-solid secondary battery 1 may have improved characteristics by an appropriate amount of lithium precipitated in the anode layer while sufficiently demonstrating functions performed by the thin film 24. The thin film 24 may be formed on the anode current collector 21 by, for example, a vacuum deposition method, a sputtering method, or a plating method.

Preparation Method of Solid Ion Conductor

The method of preparing the solid ion conductor according to an embodiment may include: preparing a precursor for forming the solid ion conductor; providing a precursor mixture for forming the solid ion conductor by performing mechanical milling on the solid-ion-conductor forming precursor; and preparing the solid ion conductor including a compound represented by Formula 1 by molding the solid-ion-conductor forming precursor mixture:

$$Li_aM_bM'_cX_dO_e \qquad \text{Formula 1}$$

wherein, in Formula 1,

M is one or more metals selected from Lu, Ho, Nd, Sm, Eu, Gd, Tb, Dy, Er, Tm, Yb, Ga, In, Ce, Pr, Ti, Zr, or Hf, which has an oxidation number of +3 or +4, M' is one or more metals selected from Na, K, Cs, Cu, or Ag, which has an oxidation number of +1, X is one or more halogens, $0<a<4$, $0.5<b<1.5$, $0\leq c<1.5$, $0<d<6.5$, and $0<e<1$.

According to the preparation method of the solid ion conductor, the solid ion conductor having excellent ion conductivity, electrochemical stability over a wide voltage window, and excellent cycle stability with respect to a lithium-containing metal electrode when used in an electrochemical device as a solid electrolyte and reversibly exhibiting a cathode capacity, may be easily prepared at a low temperature.

In providing the solid-ion-conductor forming precursor mixture, a lithium precursor, an M precursor, an M' precursor, and a halogen precursor may be mixed. The M precursor may be a precursor of a metal element having an oxidation number of +3 or +4, and the M' precursor may be a precursor of a metal element having an oxidation number of +1.

The lithium precursor, the M precursor, and the M' precursor may include one or more selected from a chloride, a halide, an oxide, a nitride, an oxynitride, a nitrate, a hydroxide, or a carbonate. For example, the lithium precursor may be a lithium chloride. Examples of the M precursor may include one or more selected from a chloride, a halide, an oxide, a nitride, an oxynitride, a nitrate, a hydroxide, or a carbonate of an element of one or more selected from Lu, Ho, Nd, Sm, Eu, Gd, Tb, Dy, Er, Tm, Yb, Ga, In, Ce, Pr, Ti, Zr, or Hf. For example, the M' precursor may be a chloride of one or more selected from Na, K, Cs, Cu, or Ag.

The mixture may be prepared by contacting a starting material with an appropriate amount, for example, a stoichiometric amount, of the compound. Mechanical milling may be performed on the mixture.

Examples of the mechanical milling may include one or more selected from ball-milling, air jet-milling, bead-milling, roll-milling, planetary milling, hand milling, high energy ball milling, planetary ball-milling, stirred ball milling, vibrating milling, mechanofusion milling, shaker milling, attritor milling, disk milling, shape milling, nauta milling, nobilta milling, or high speed mixing. For example, the mechanical milling may be planetary milling and may be performed at room temperature. After performing the mechanical milling, the preparation method of the solid ion conductor may further include molding.

After performing the mechanical milling, the preparation method of the solid ion conductor may further include conditioning the resultant product. For example, the conditioning may include keeping the resultant product at room temperature for about 1-10 minutes or about 2 to 8 minutes.

Hereinafter, the disclosed aspects will be described in more detail through the following Examples and Comparative Examples. However, the following Examples are intended to illustrate the disclosed aspects, and the scope of the inventive idea is shall not be limited by these Examples.

EXAMPLES

Solid Ion Conductor

Example 1: Preparation of $Li_{3.6}Lu_{0.9}Cl_{5.7}O_{0.3}$ Solid Ion Conductor

To a reactor were added $LuCl_3$, LiCl, and $Li_2O$ weighed so as to give a stoichiometric ratio of 0.9:3:0.3 and then mixed to prepare a precursor mixture for forming a solid ion conductor. The solid-ion-conductor forming precursor mixture was mixed at 500 rpm using a planetary mill (Pulverisette 7 premium line) with zirconia (YSZ) balls having a diameter of 10 mm for 15 minutes, and then rested for 5 minutes, and this cycle was repeatedly performed for a total of 24 hours, thereby obtaining a precursor mixture. The precursor mixture was placed in a 1-inch diameter pelletizer having a diameter of 1 inch, and a pressure of 5 tons was applied using uniaxial pressure molding for 2 minutes to manufacture a $Li_{3.6}Lu_{0.9}Cl_{5.7}O_{0.3}$ solid ion conductor pellet in the form of a circular disc.

Example 2: Preparation of $Li_{3.6}Lu_{0.9}Cl_{1.7}Br_4O_{0.3}$ Solid Ion Conductor A $Li_{3.6}Lu_{0.9}Cl_{1.7}Br_4O_{0.3}$ solid ion conductor pellet was prepared in the same manner as in Example 1, except that $LuBr_3$, LiCl, LiBr, and $Li_2O$ were added to a reactor at a stoichiometric ratio of 0.9:1.7:1.3:0.3.

Example 3: Preparation of $Li_{3.6}Ho_{0.9}Cl_{1.7}Br_4O_{0.3}$ Solid Ion Conductor A $Li_{3.6}Ho_{0.9}Cl_{1.7}Br_4O_{0.3}$ solid ion conductor pellet was prepared in the same manner as in Example 1, except that $HoCl_3$, LiCl, LiBr, and $Li_2O$ were added to a reactor at a stoichiometric ratio of 0.9:1.7:1.3:0.3.

Example 4: Preparation of $Li_{3.57}Na_{0.03}Ho_{0.9}Cl_{1.7}Br_4O_{0.3}$ Solid Ion Conductor A $Li_{3.57}Na_{0.03}Ho_{0.9}Cl_{1.7}Br_4O_{0.3}$ solid ion conductor pellet was prepared in the same manner as in Example 1, except that $HoBr_3$, LiCl, NaCl, LiBr, and $Li_2O$ were added to a reactor at a stoichiometric ratio of 0.9:1.67:0.03:1.3:0.3.

Example 5: Preparation of $Li_{3.2}InCl_6O_{0.1}$ Solid Ion Conductor

A $Li_{3.2}InCl_6O_{0.1}$ solid ion conductor pellet was prepared in the same manner as in Example 1, except that $InCl_3$, LiCl, and $Li_2O$ were added to a reactor at a stoichiometric ratio of 1:3:0.1.

Comparative Example 1: Preparation of $Li_3LuCl_6$ Solid Ion Conductor

A $Li_3LuCl_6$ solid ion conductor pellet was prepared in the same manner as in Example 1, except that $LuCl_3$ and LiCl were added to a reactor at a stoichiometric ratio of 1:3.

Comparative Example 2: Preparation of $Li_3HoCl_6$ Solid Ion Conductor

A $Li_3HoCl_6$ solid ion conductor pellet was prepared in the same manner as in Example 1, except that $HoCl_3$ and LiCl were added to a reactor at a stoichiometric ratio of 1:3.

Comparative Example 3: Preparation of $Li_3InCl_6$ Solid Ion Conductor

A $Li_3InCl_6$ solid ion conductor pellet was prepared in the same manner as in Example 1, except that $InCl_3$ and LiCl were added to a reactor at a stoichiometric ratio of 1:3.

Comparative Example 4: Preparation of $Li_3YCl_6$ Solid Ion Conductor

A $Li_3YCl_6$ solid ion conductor pellet was prepared in the same manner as in Example 1, except that $YCl_3$ and LiCl were added to a reactor at a stoichiometric ratio of 1.3.

All Solid Secondary Battery

Example 6: Manufacture of All-Solid Secondary Battery

Preparation of Anode Layer

An anode layer was prepared by placing a 20 μm thick Li foil deposited on one surface of a 10 μm thick Cu current collector on a bottom surface of a tubular cell case having an inner diameter of 13 mm.

Solid Electrolyte Layer

A solid electrolyte layer was prepared by filling a 13 mm-diameter tubular cell case with the $Li_{3.6}Lu_{0.9}Cl_{5.7}O_{0.3}$ solid ion conductor pellet in the form of powder, prepared in Example 1.

Preparation of Cathode Layer $LiNi_{0.8}Co_{0.15}Mn_{0.05}O_2$ (NCM) as a cathode active material, an argyrodite-type $Li_6PS_5Cl$ solid ion conductor (pellet) (Mitusi, S33) as a solid electrolyte, and carbon nanofiber (CNF) as a conductive agent were mixed at a mass ratio of 60:35:5. A cathode layer was prepared by applying 15 mg of the mixture in the form of powder onto a solid electrolyte layer in the 13 mm-diameter tubular cell case.

Manufacture of All-Solid Secondary Battery

A torque-cell-type all-solid secondary battery was manufactured by placing an SUS (stainless steel) electrode having a diameter of 13 mm on the anode layer/solid electrolyte layer/cathode layer and applying a pressure of 4 tons for 2 minutes.

Examples 7-10

Manufacture of All-Solid Secondary Batteries

All-solid secondary batteries were manufactured in the same manner as in Example 6, except that solid ion conductor pellets prepared in Examples 2 to 5 were used as a solid electrolyte layer.

Comparative Examples 5-8

Manufacture of All-Solid Secondary Batteries

All-solid secondary batteries were manufactured in the same manner as in Example 6, except that solid ion conductor pellets prepared in Comparative Examples 1 to 4 were used as a solid electrolyte layer.

Evaluation Example 1

Cyclic Voltammetry (1) Evaluation of Cycle Stability

Each 300 mg of the solid ion conductor pellets prepared in Examples 1-5 and Comparative Examples 1-4 were compressed so as to have a diameter of 13 mm. Then, a Li electrode having a diameter of 8 mm was attached to both surfaces of each solid ion conductor pellet and then subjected to cold isostatic pressing (CIP) at 250 MPa for 3 minutes, thereby manufacturing a lithium symmetrical cell having a Li/solid ion conductor/Li structure. Cycle stability of the lithium symmetrical cell was evaluated by cyclic voltammetry analysis with a current density of 0.1 mA/cm² at a voltage range of −1.0 V to 1.0 V while varying directions of current applied every hour. Some or all of the results are shown in FIG. 6 and Table 1.

TABLE 1

| | Cycle stability (Cycles) |
|---|---|
| Example 1 | 255 |
| Example 2 | 489 |
| Example 3 | 295 |
| Example 4 | 300 |
| Example 5 | 122 |
| Comparative Example 1 | 72 |
| Comparative Example 2 | 1 |
| Comparative Example 3 | 1 |
| Comparative Example 4 | 6 |

Figure 6:
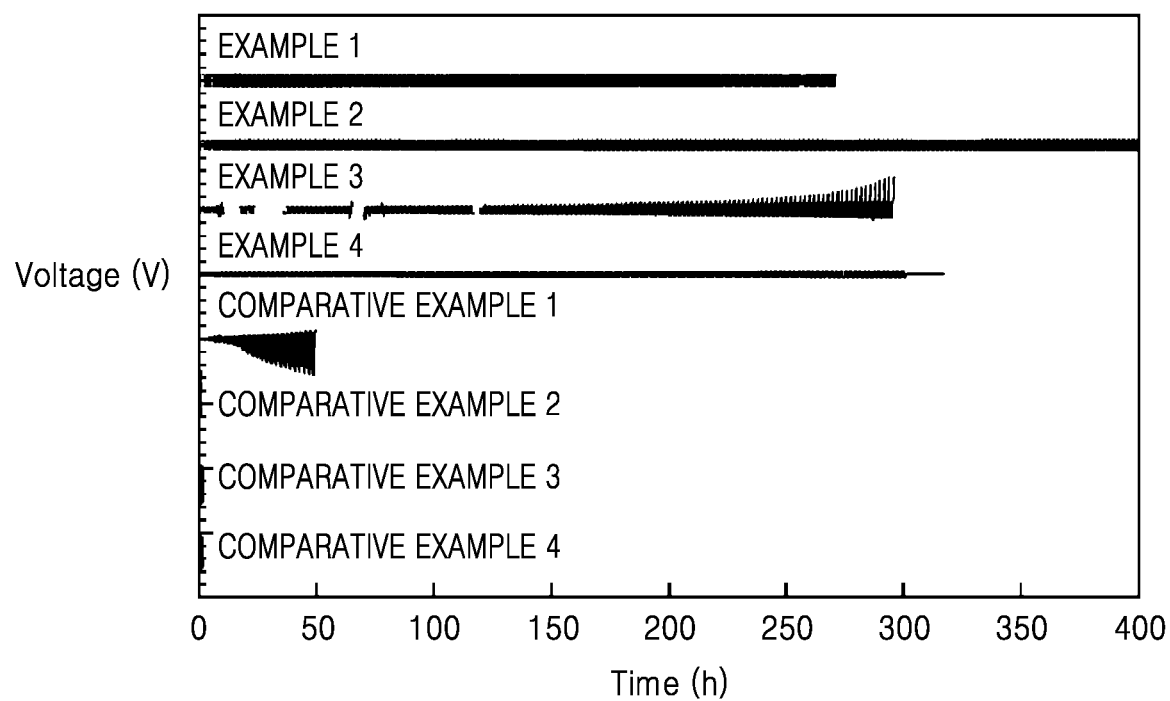
FIG. 6 is a graph of voltage (volts, v) versus time (hours, h) showing cyclic voltammetry results of lithium symmetrical cells having a Li/solid ion conductor/Li structure prepared by using pellets of the solid ion conductor prepared in Examples 1 to 4 and Comparative Examples 1 to 4 as the solid electrolyte.

Referring to FIG. 6 and Table 1, lithium symmetric cells manufactured using the solid ion conductor pellets prepared in Examples 1 to 5 as solid electrolytes stably operated for 122 or more cycles. By contrast, the lithium symmetric cell manufactured using the solid ion conductor pellet prepared in Comparative Example 1 as a solid electrolyte operated up to 72 cycles, and the lithium symmetric cells manufactured using the solid ion conductor pellets prepared in Comparative Examples 2 to 4 as solid electrolytes did not properly operate.

(2) Evaluation of Reduction Voltage and 0 V Reduction Current

An anode layer was prepared by placing a 20 μm thick Li foil deposited on one surface of a 10 μm thick Cu current collector on a bottom surface of a tubular cell case having an inner diameter of 13 mm. 150 mg of argyrodite-type $Li_6PS_5Cl$ solid ion conductor pellet, each 300 mg of the solid ion conductor pellets prepared in Examples 1 to 5 and Comparative Examples 1 to 4, and SUS (stainless steel) were sequentially inserted into the cell case, compressed with a pressure of 4 tons, thereby manufacturing a cell. A cell having an SUS electrode as a working electrode and a lithium electrode as a counter electrode was analyzed by cyclic voltammetry with a sweep rate of 0.1 mV/s between −1.0 V and 4.0 V. A reduction current threshold was set to reduction potential of a solid electrolyte. Zero V reduction current was obtained through the cyclic voltammetry analysis. Some or all of the results are shown in FIG. 7 and Table 2.

TABLE 2

| | Reduction Potential (V) | 0 V Reduction Current (mA/cm²) |
|---|---|---|
| Example 1 | −0.02 | 0.004 |
| Example 2 | −0.02 | 0.003 |
| Example 3 | −0.02 | 0.010 |
| Example 4 | −0.02 | 0.002 |
| Example 5 | −0.01 | 0.098 |
| Comparative Example 1 | 0.44 | 0.28 |
| Comparative Example 2 | 0.44 | 0.25 |
| Comparative Example 3 | 1.7 | 0.62 |
| Comparative Example 4 | 0.44 | 1.01 |

Figure 7:
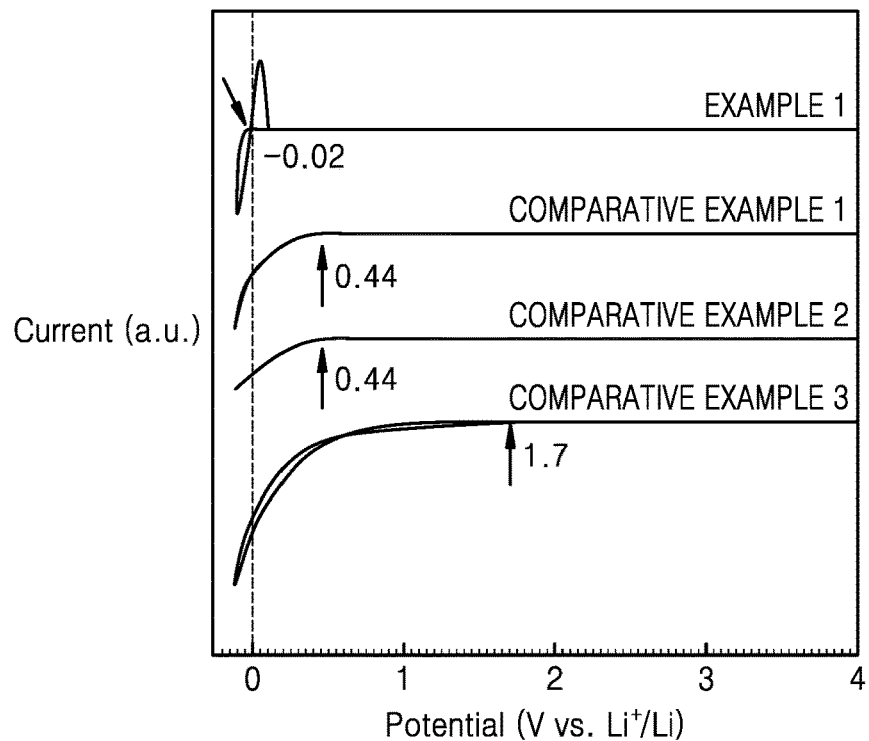
FIG. 7 is a graph of current (arbitrary units, a.u.) versus potential (Volt, v) showing cyclic voltammetry results of lithium symmetrical cells having a Li/Li$_6$PS$_5$Cl solid ion conductor/solid ion conductor/SUS structure prepared by using pellets of the solid ion conductor prepared in Example 1 and Comparative Examples 1 to 3 as solid electrolytes.

Referring to FIG. 7 and Table 2, lithium symmetric cells manufactured using the solid ion conductor pellets prepared in Examples 1 to 5 as solid electrolytes showed a reduction potential of 0 V or less and 0 V reduction current of 0.1 mA/cm² or less relative to a lithium metal electrode. By contrast, the lithium symmetric cells manufactured using the solid ion conductor pellets prepared in Comparative Examples 1 to 4 as solid electrolytes showed a reduction potential of 0.44 V or greater and 0 V reduction current of 0.25 mA/cm² or greater relative to a lithium metal electrode.

Based on these findings, it was confirmed that the cells manufactured using the solid ion conductor pellets prepared in Examples 1 to 5 as solid electrolytes had significantly improved electrochemical stability with respect to a lithium metal electrode, compared to the cells manufactured using the solid ion conductor pellets prepared in Comparative Examples 1 to 4 as solid electrolytes.

Evaluation Example 2: Charge-Discharge Profile

The all-solid secondary battery manufactured according to Example 1 was charged and discharged at 25° C. at a current rate of 0.025 to 1 C (1 C=1.9 mA/cm²) in a voltage range of 2.5 to 4.2 V. A C rate means a current which will discharge a battery in one hour, e.g., a C rate for a battery having a discharge capacity of 1.6 ampere-hours would be 1.6 amperes.

The all-solid secondary battery was charged at a constant current of 0.05 C until a battery voltage reached 4.2 V, and discharging was then performed at a constant current of 0.025 C until the battery voltage reached 2.5 V (First cycle).

Next, charging was performed at a constant current of 0.1 C until the battery voltage reached 4.2 V, and discharging was then performed at a constant current of 0.03 C until the battery voltage reached 2.5 V (Second cycle).

Then, charging was performed at a constant current of 0.1 C until the battery voltage reached 4.2 V, and discharging was then performed at a constant current of 0.5 C until the battery voltage reached 2.5 V (Third cycle).

Next, charging was performed at a constant current of 0.03 C until the battery voltage reached 4.2 V, and discharging was then performed at a constant current of 1 C until the battery voltage reached 2.5 V (Fourth cycle).

Figure 8:
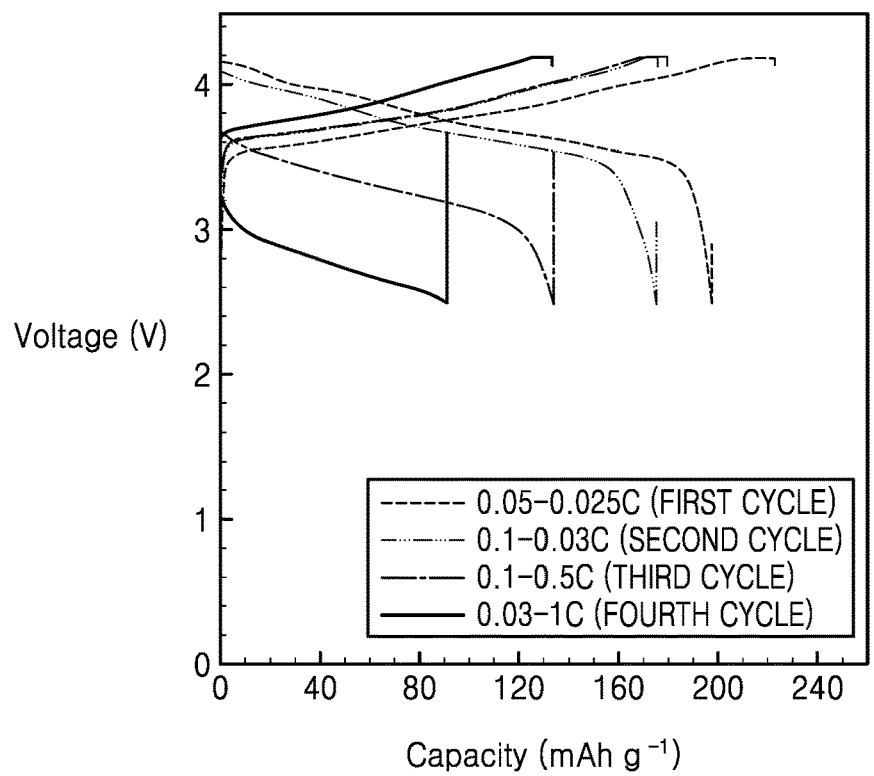
FIG. 8 is a graph of voltage (volt, v) versus capacity (milliampere-hours per gram, mAh g−1) showing a voltage profile of an all-solid secondary battery prepared according to Example 1.

The charging and discharging cycles were performed, and the voltage profiles thereof are shown in FIG. 8.

Referring to FIG. 8, it is confirmed that the all-solid secondary battery manufactured according to Example 1 reversibly exhibits a cathode capacity of about 200 mAh/g.

The solid ion conductor according to an aspect is a halide-based solid ion conductor having some of halide elements substituted with oxygens and including a metal having an oxidation number of +3 or +4 as the central element. In addition, the compound is a halide-based solid ion conductor including a metal having an oxidation number of +3 or +4 as the central element and having some of halide elements substituted with oxygens and with metals having an oxidation number of +3 or +4 substituted for a Li site.

By having excellent ion conductivity and introducing oxygens, the solid ion conductor may be used as a solid electrolyte suppressing a chain reaction of reducing the central element when contacting a lithium-containing metal electrode. When the solid ion conductor is used in an electrochemical device, the electrochemical device may have excellent cycle stability with respect to a lithium-containing metal electrode when assembled in a cell, and reversible exhibition of designed cathode capacity.

The solid ion conductor may be included in a solid electrolyte layer, a cathode layer, an anode layer, a cathode layer protecting film, or an anode layer protecting film of an electrochemical device, for example, an all-solid secondary battery or a metal air battery.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A solid ion conductor comprising a compound represented by Formula 1:

$$Li_aM_bM'_cX_dO_e \qquad \text{Formula 1}$$

wherein, in Formula 1,

M is one or more metals selected from Lu, Ho, Nd, Sm, Eu, Gd, Tb, Dy, Er, Tm, Yb, Ga, In, Ce, Pr, Ti, Zr, or Hf, each having an oxidation number of +3 or +4, M' is one or more metals selected from Na, K, Cs, Cu, or Ag, each having an oxidation number of +1, X is one or more halogens, $0<a<4$, $0.5<b<1.5$, $0<c<1.5$, $0<d<6.5$, and $0<e<1$, when M is Zr, $0<c<1.5$; and when M is one or more metals selected from Lu, Ho, Nd, Sm, Eu, Gd, Tb, Dy, Er, Tm, Yb, Ga, In, Ce, Pr, Ti, or Hf, or when M is Zr in combination with one or more metal selected from Lu, Ho, Nd, Sm, Eu, Gd, Tb, Dy, Er, Tm, Yb, Ga, In, Ce, Pr, Ti, or Hf, $0 \le c \le 1.5$.

2. The solid ion conductor of claim 1, wherein the compound is a compound represented by Formula 2:

$$Li_aM_bM'_cCl_{d1}Br_{d2}F_{d3}I_{d4}O_e$$

wherein, in Formula 2,

M is one or more metals selected from Lu, Ho, Nd, Sm, Eu, Gd, Tb, Dy, Er, Tm, Yb, Ga, In, Ce, Pr, Ti, Zr, or Hf, each having an oxidation number of +3 or +4, M' is one or more metals selected from Na, K, Cs, Cu, or Ag, each having an oxidation number of +1, $0<a<4$, $0.5<b<1.5$, $0<d1<6.5$, $0<d2<6.5$, $0<d3<6.5$, $0<d4<6.5$, and $0<e<1$, when M is Zr, $0<c<1.5$; and when M is one or more metals selected from Lu, Ho, Nd, Sm, Eu, Gd, Tb, Dy, Er, Tm, Yb, Ga, In, Ce, Pr, Ti, or Hf, or when M is Zr in combination with one or more metal selected from Lu, Ho, Nd, Sm, Eu, Gd, Tb, Dy, Er, Tm, Yb, Ga, In, Ce, Pr, Ti, or Hf, $0<c<1.5$.

3. The solid ion conductor of claim 1, wherein the compound is a compound represented by Formula 3:

$$Li_aM_bM'_cX_dO_e,$$

wherein, in Formula 3,

M is one or more metals selected from Lu, Ho, Nd, Sm, Eu, Gd, Tb, Dy, Er, Tm, Yb, Ga, In, Ce, Pr, Ti, Zr, or Hf, each having an oxidation number of +3 or +4, M' is one or more metals selected from Na, K, Cs, Cu, or Ag, each having an oxidation number of +1, X is one or more selected from Cl or Br, $0<a<4$, $0.5<b<1.5$, $0<d1<6.5$, $0<e<1$, and $0<e/b<0.5$, when M is Zr, $0<c<1.5$; and when M is one or more metals selected from Lu, Ho, Nd, Sm, Eu, Gd, Tb, Dy, Er, Tm, Yb, Ga, In, Ce, Pr, Ti, or Hf, or when M is Zr in combination with one or more metal selected from Lu, Ho, Nd, Sm, Eu, Gd, Tb, Dy, Er, Tm, Yb, Ga, In, Ce, Pr, Ti, or Hf, $0 \le c<1.5$.

4. The solid ion conductor of claim 1, wherein the compound is a compound represented by Formula 4:

$$Li_aM_bM'_cX_dO_e,$$

wherein, in Formula 4,

M is one or more metals selected from Lu, Ho, Nd, Sm, Eu, Gd, Tb, Dy, Er, Tm, Yb, Ga, In, Ce, Pr, Ti, Zr, or Hf, each having an oxidation number of +3 or +4, M' is one or more metals selected from Na, K, Cs, Cu, or Ag, each having an oxidation number of +1, X is one or more selected from Cl or Br, $0<a<4$, $0.5<b<1.5$, $0<d1<6.5$, $0<e<1$, and $2<a/b<6$, when M is Zr, $0<c<1.5$, and when M is one or more metals selected from Lu, Ho, Nd, Sm, Eu, Gd, Tb, Dy, Er, Tm, Yb, Ga, In, Ce, Pr, Ti, or Hf, or when M is Zr in combination with one or more metal selected from Lu, Ho, Nd, Sm, Eu, Gd, Tb, Dy, Er, Tm, Yb, Ga, In, Ce, Pr, Ti, or Hf, $0 \leq c<1.5$.

5. A solid ion conductor comprising a compound represented by Formula 5 or 6:

$$Li_pM_qX_{r-w}O_w \quad \text{Formula 5}$$

wherein, in Formula 5,

M is one or more metals selected from Lu, Ho, Nd, Sm, Eu, Gd, Tb, Dy, Er, Tm, Yb, Ga, In, Ce, Pr, Ti, Zr, or Hf, each having an oxidation number of +3, X is one or more selected from Cl or Br, $0<p<4$, $0.5<q<1.5$, $0<r<6.5$, $0<w<1$, and $0<w/q<0.5$;

$$Li_pM_qM'_zX_{r-w}O_w \quad \text{Formula 6}$$

wherein, in Formula 6,

M is one or more metals selected from Lu, Ho, Nd, Sm, Eu, Gd, Tb, Dy, Er, Tm, Yb, Ga, In, Ce, Pr, Ti, Zr, or Hf, each having an oxidation number of +3, M' is one or more metals selected from Na, K, Cs, Cu, or Ag, each having an oxidation number of +1, X is one or more selected from Cl or Br, $0<p<4$, $0.5<q<1.5$, $0<z<1.5$, $0<r<6.5$, $0<w<1$, and $2<p/q<6$, $0<w/q<0.5$.

6. The solid ion conductor of claim 1, wherein the compound comprises one or more selected from:

$Li_{3.6}Lu_{0.9}Cl_{5.7}O_{0.3}$, $Li_{3.6}Lu_{0.9}Cl_{1.7}Br_4O_{0.3}$,
$Li_{3.6}Ho_{0.9}Cl_{5.7}O_{0.3}$, $Li_{3.6}Ho_{0.9}Cl_{1.7}Br_4O_{0.3}$,
$Li_{3.6}Nd_{0.9}Cl_{5.7}O_{0.3}$, $Li_{3.6}Nd_{0.9}Cl_{1.7}Br_4O_{0.3}$,
$Li_{3.6}Sm_{0.9}Cl_{5.7}O_{0.3}$, $Li_{3.6}Sm_{0.9}Cl_{1.7}Br_4O_{0.3}$,
$Li_{3.6}Eu_{0.9}Cl_{5.7}O_{0.3}$, $Li_{3.6}Eu_{0.9}Cl_{1.7}Br_4O_{0.3}$,
$Li_{3.6}Gd_{0.9}Cl_{5.7}O_{0.3}$, $Li_{3.6}Gd_{0.9}Cl_{1.7}Br_4O_{0.3}$,
$Li_{3.6}Tb_{0.9}Cl_{5.7}O_{0.3}$, $Li_{3.6}Tb_{0.9}Cl_{1.7}Br_4O_{0.3}$,
$Li_{3.6}Dy_{0.9}Cl_{5.7}O_{0.3}$, $Li_{3.6}Dy_{0.9}Cl_{1.7}Br_4O_{0.3}$,
$Li_{3.6}TM_{0.9}Cl_{5.7}O_{0.3}$, $Li_{3.6}TM_{0.9}Cl_{1.7}Br_4O_{0.3}$,
$Li_{3.6}Yb_{0.9}Cl_{5.7}O_{0.3}$, $Li_{3.6}Yb_{0.9}Cl_{1.7}Br_4O_{0.3}$,
$Li_{3.6}Ga_{0.9}Cl_{5.7}O_{0.3}$, $Li_{3.6}Ga_{0.9}Cl_{1.7}Br_4O_{0.3}$,
$Li_{3.6}In_{0.9}Cl_{5.7}O_{0.3}$, $Li_{3.6}In_{0.9}Cl_{1.7}Br_4O_{0.3}$;

$Li_{3.57}Na_{0.03}Lu_{0.9}Cl_{1.7}Br_4O_{0.3}$,
$Li_{3.57}Na_{0.03}Ho_{0.9}Cl_{1.7}Br_4O_{0.3}$,
$Li_{3.57}Na_{0.03}Nd_{0.9}Cl_{1.7}Br_4O_{0.3}$, $Li_{3.57}Na_{0.03}Sm_{0.9}Cl_{1.7}Br_4O_{0.3}$, $Li_{3.57}Na_{0.03}Eu_{0.9}Cl_{1.7}Br_4O_{0.3}$,
$Li_{3.57}Na_{0.03}Gd_{0.9}Cl_{1.7}Br_4O_{0.3}$,
$Li_{3.57}Na_{0.03}Tb_{0.9}Cl_{1.7}Br_4O_{0.3}$,
$Li_{3.57}Na_{0.03}Dy_{0.9}Cl_{1.7}Br_4O_{0.3}$,
$Li_{3.57}Na_{0.03}TM_{0.9}Cl_{1.7}Br_4O_{0.3}$,
$Li_{3.57}Na_{0.03}Yb_{0.9}Cl_{1.7}Br_4O_{0.3}$,
$Li_{3.57}Na_{0.03}Ga_{0.9}Cl_{1.7}Br_4O_{0.3}$,
$Li_{3.57}Na_{0.03}In_{0.9}Cl_{1.7}Br_4O_{0.3}$;

$Li_{3.57}K_{0.03}Lu_{0.9}Cl_{1.7}Br_4O_{0.3}$,
$Li_{3.57}K_{0.03}Ho_{0.9}Cl_{1.7}Br_4O_{0.3}$,
$Li_{3.57}K_{0.03}Nd_{0.9}Cl_{1.7}Br_4O_{0.3}$, $Li_{3.57}K_{0.03}Sm_{0.9}Cl_{1.7}Br_4O_{0.3}$, $Li_{3.57}K_{0.03}Eu_{0.9}Cl_{1.7}Br_4O_{0.3}$,
$Li_{3.57}K_{0.03}Gd_{0.9}Cl_{1.7}Br_4O_{0.3}$,
$Li_{3.57}K_{0.03}Tb_{0.9}Cl_{1.7}Br_4O_{0.3}$,
$Li_{3.57}K_{0.03}Dy_{0.9}Cl_{1.7}Br_4O_{0.3}$,
$Li_{3.57}K_{0.03}In_{0.9}Cl_{1.7}Br_4O_{0.3}$,
$Li_{3.57}K_{0.03}Yb_{0.9}Cl_{1.7}Br_4O_{0.3}$,
$Li_{3.57}K_{0.03}Ga_{0.9}Cl_{1.7}Br_4O_{0.3}$,
$Li_{3.57}K_{0.03}In_{0.9}Cl_{1.7}Br_4O_{0.3}$;

$Li_{3.57}Cs_{0.03}Lu_{0.9}Cl_{1.7}Br_4O_{0.3}$,
$Li_{3.57}Cs_{0.03}Ho_{0.9}Cl_{1.7}Br_4O_{0.3}$,
$Li_{3.57}Cs_{0.03}Nd_{0.9}Cl_{1.7}Br_4O_{0.3}$, $Li_{3.57}Cs_{0.03}Sm_{0.9}Cl_{1.7}Br_4O_{0.3}$, $Li_{3.57}Cs_{0.03}Eu_{0.9}Cl_{1.7}Br_4O_{0.3}$,
$Li_{3.57}Cs_{0.03}Gd_{0.9}Cl_{1.7}Br_4O_{0.3}$,
$Li_{3.57}Cs_{0.03}Tb_{0.9}Cl_{1.7}Br_4O_{0.3}$,
$Li_{3.57}Cs_{0.03}Dy_{0.9}Cl_{1.7}Br_4O_{0.3}$,
$Li_{3.57}Cs_{0.03}Tm_{0.9}Cl_{1.7}Br_4O_{0.3}$,
$Li_{3.57}Cs_{0.03}Yb_{0.9}Cl_{1.7}Br_4O_{0.3}$,
$Li_{3.57}Cs_{0.03}Ga_{0.9}Cl_{1.7}Br_4O_{0.3}$,
$Li_{3.57}Cs_{0.03}In_{0.9}Cl_{1.7}Br_4O_{0.3}$;

$Li_{3.57}Cu_{0.03}Lu_{0.9}Cl_{1.7}Br_4O_{0.3}$,
$Li_{3.57}Cu_{0.03}Ho_{0.9}Cl_{1.7}Br_4O_{0.3}$,
$Li_{3.57}Cu_{0.03}Nd_{0.9}Cl_{1.7}Br_4O_{0.3}$, $Li_{3.57}Cu_{0.03}Sm_{0.9}Cl_{1.7}Br_4O_{0.3}$, $Li_{3.57}Cu_{0.03}Eu_{0.9}Cl_{1.7}Br_4O_{0.3}$,
$Li_{3.57}Cu_{0.03}Gd_{0.9}Cl_{1.7}Br_4O_{0.3}$,
$Li_{3.57}Cu_{0.03}Tb_{0.9}Cl_{1.7}Br_4O_{0.3}$,
$Li_{3.57}Cu_{0.03}Dy_{0.9}Cl_{1.7}Br_4O_{0.3}$,
$Li_{3.57}Cu_{0.03}Tm_{0.9}Cl_{1.7}Br_4O_{0.3}$,
$Li_{3.57}Cu_{0.03}Yb_{0.9}Cl_{1.7}Br_4O_{0.3}$,
$Li_{3.57}Cu_{0.03}Ga_{0.9}Cl_{1.7}Br_4O_{0.3}$,
$Li_{3.57}Cu_{0.03}In_{0.9}Cl_{1.7}Br_4O_{0.3}$;

$Li_{3.57}Ag_{0.03}Lu_{0.9}Cl_{1.7}Br_4O_{0.3}$,
$Li_{3.57}Ag_{0.03}Ho_{0.9}Cl_{1.7}Br_4O_{0.3}$,
$Li_{3.57}Ag_{0.03}Nd_{0.9}Cl_{1.7}Br_4O_{0.3}$, $Li_{3.57}Ag_{0.03}Sm_{0.9}Cl_{1.7}Br_4O_{0.3}$, $Li_{3.57}Ag_{0.03}Eu_{0.9}Cl_{1.7}Br_4O_{0.3}$,
$Li_{3.57}Ag_{0.03}Gd_{0.9}Cl_{1.7}Br_4O_{0.3}$,
$Li_{3.57}Ag_{0.03}Tb_{0.9}Cl_{1.7}Br_4O_{0.3}$,
$Li_{3.57}Ag_{0.03}Dy_{0.9}Cl_{1.7}Br_4O_{0.3}$,
$Li_{3.57}Ag_{0.03}Tm_{0.9}Cl_{1.7}Br_4O_{0.3}$,
$Li_{3.57}Ag_{0.03}Yb_{0.9}Cl_{1.7}Br_4O_{0.3}$,
$Li_{3.57}Ag_{0.03}Ga_{0.9}Cl_{1.7}Br_4O_{0.3}$,
$Li_{3.57}Ag_{0.03}In_{0.9}Cl_{1.7}Br_4O_{0.3}$; or $Li_{3.2}LuCl_6O_{0.1}$, $Li_{3.2}HoCl_6O_{0.1}$, $Li_{3.2}NdCl_6O_{0.1}$,
$Li_{3.2}SmCl_6O_{0.1}$, $Li_{3.2}EuCl_6O_{0.1}$, $Li_{3.2}GdCl_6O_{0.1}$,
$Li_{3.2}TbCl_6O_{0.1}$, $Li_{3.2}DyCl_6O_{0.1}$, $Li_{3.2}ErCl_6O_{0.1}$,
$Li_{3.2}TmCl_6O_{0.1}$, $Li_{3.2}YbCl_6O_{0.1}$, $Li_{3.2}GaCl_6O_{0.1}$,
$Li_{3.2}InCl_6O_{0.1}$, $Li_{3.2}CeCl_6O_{0.1}$, or $Li_{3.2}PrCl_6O_{0.1}$.

7. The solid ion conductor of claim 1, wherein the compound has a distorted rock-salt-type crystal structure.

8. The solid ion conductor of claim 1, wherein the compound has a crystal structure comprising M-centered $MX_6$ octahedra, in which the $MX_6$ octahedra are edge-sharing, the X halogens are located at an edge of the octahedra, and oxygens occupy a portion of the X sites.

9. The solid ion conductor of claim 8, wherein in the crystal structure of the compound, the compound has a three-dimensional lithium ion movement channel in x-, y-, and z-axis directions that is different than the $MX_6$ octahedra.

10. The solid ion conductor of claim 8, wherein in the crystal structure of the compound, the compound has a lithium ion movement channel which is three-dimensionally connected.

11. The solid ion conductor of claim 1, wherein the solid ion conductor has an ion conductivity of $1.0 \times 10^{-5}$ millisiemens per centimeter or greater at 25° C.

12. A solid electrolyte comprising:
the solid ion conductor of claim 1, and optionally one or more of an oxide solid electrolyte, or a sulfide solid electrolyte.

13. The solid electrolyte of claim 12, wherein the solid electrolyte is electrochemically stable between 0.6 volt to 4.3 volts versus $Li/Li^+$.

14. An electrochemical device comprising
a cathode layer;
an anode layer; and
a solid electrolyte layer disposed between the cathode layer and the anode layer,
wherein one or more of the cathode layer, the anode layer, or the solid electrolyte layer comprises the solid electrolyte of claim 12.

15. The electrochemical device of claim 14, further comprising a protective film, wherein the protective film is on one or more of the cathode layer or the anode layer and the protective film comprises the solid electrolyte.

16. The electrochemical device of claim 14, wherein the cathode layer comprises:
a cathode active material comprising one or more selected from a lithium transition metal oxide, a lithium transition metal phosphate, or a sulfide; and
the solid ion conductor.

17. The electrochemical device of claim 14, wherein the anode layer comprises one or more selected from lithium metal or a lithium alloy.

18. The electrochemical device of claim 14, wherein a reduction voltage of the solid electrolyte layer relative to lithium metal is 0 volt or less.

19. The electrochemical device of claim 14, wherein a zero voltage reduction current of the solid electrolyte relative to lithium metal is 0.1 milliampere per square centimeter or less.

20. The electrochemical device of claim 14, wherein the solid electrolyte layer comprises the solid ion conductor.

21. The electrochemical device of claim 20, wherein the sulfide solid electrolyte comprises a solid electrolyte represented by Formula 7:

$$Li^+{}_{12-n-z}A^{n+}Q^{2-}{}_{6-z}Y'^-{}_z \quad \text{Formula 7}$$

wherein, in Formula 7,
A is P, As, Ge, Ga, Sb, Si, Sn, Al, In, Tl, V, Nb, or Ta,
Q is one or more selected from S, Se, or Te,
Y' is one or more selected from Cl, Br, I, F, CN, OCN, SCN, or $N_3$,
1<n<5, and 0<z<2.

22. The electrochemical device of claim 14, wherein the solid electrolyte layer has a thickness of about 10 micrometers to about 1 millimeter.

23. The electrochemical device of claim 14, wherein the electrochemical device is an all-solid secondary battery or a metal-air battery.

24. A method of preparing a solid ion conductor, the method comprising:
preparing a precursor for forming the solid ion conductor;
providing a precursor mixture for forming the solid ion conductor by performing mechanical milling of the solid-ion-conductor forming precursor; and
preparing the solid ion conductor comprising a compound represented by Formula 1 by molding the solid-ion-conductor forming precursor mixture:

$$Li_aM_bM'_cX_dO_e,$$

wherein, in Formula 1,
M is one or more metals selected from Lu, Ho, Nd, Sm, Eu, Gd, Tb, Dy, Er, Tm, Yb, Ga, In, Ce, Pr, Ti, Zr, or Hf, each having an oxidation number of +3 or +4, M' is one or more metals selected from Na, K, Cs, Cu, or Ag, each having an oxidation number of +1,
X is one or more halogens,
0<a<4, 0.5<b<1.5, 0<d1<6.5, and 0<e<1,
when M is Zr, 0<c<1.5, and
when M is Zr, 0<c<1.5; and
when M is one or more metals selected from Lu, Ho, Nd, Sm, Eu, Gd, Tb, Dy, Er, Tm, Yb, Ga, In, Ce, Pr, Ti, or Hf, or when M is Zr in combination with one or more metal selected from Lu, Ho, Nd, Sm, Eu, Gd, Tb, Dy, Er, Tm, Yb, Ga, In, Ce, Pr, Ti, or Hf, 0≤c<1.5.

25. The method of claim 24, wherein the mechanical milling comprises ball-milling, air jet-milling, bead-milling, roll-milling, planetary milling, hand milling, high energy ball milling, stirred ball milling, vibrating milling, mechanofusion milling, shaker milling, attritor milling, disk milling, shape milling, nauta milling, nobilta milling, high-speed mixing, or a combination thereof.

26. The method of claim 24, wherein the mechanical milling is planetary milling and is performed at room temperature.

27. The method of claim 24, further comprising, after the mechanical milling, conditioning the resultant product at room temperature.

28. A protected cathode layer, comprising
a cathode layer; and
a protective film comprising the solid ion conductor of claim 1 on the cathode layer.

29. A protected anode layer, comprising
an anode layer; and
a protective film comprising the solid ion conductor of claim 1 on the anode layer.

* * * * *